United States Patent
Minami

(10) Patent No.: US 9,637,130 B2
(45) Date of Patent: May 2, 2017

(54) CLUTCH CONTROL SYSTEM FOR VEHICLE

(71) Applicant: YAMAHA HATSUDOKI KABUSHIKI KAISHA, Iwata-shi, Shizuoka-ken (JP)

(72) Inventor: Kengo Minami, Iwata (JP)

(73) Assignee: YAMAHA HATSUDOKI KABUSHIKI KAISHA, Iwata-shi, Shizuoka-ken (JP)

(*) Notice: Subject to any disclaimer, the term of this patent is extended or adjusted under 35 U.S.C. 154(b) by 0 days.

(21) Appl. No.: 14/970,426

(22) Filed: Dec. 15, 2015

(65) Prior Publication Data

US 2016/0167655 A1 Jun. 16, 2016

(30) Foreign Application Priority Data

Dec. 16, 2014 (JP) ................... 2014-254386

(51) Int. Cl.
| | |
|---|---|
| *G06F 17/00* | (2006.01) |
| *B60W 30/188* | (2012.01) |
| *B60W 10/02* | (2006.01) |
| *B60W 10/06* | (2006.01) |
| *F16D 48/06* | (2006.01) |

(52) U.S. Cl.
CPC .......... *B60W 30/188* (2013.01); *B60W 10/02* (2013.01); *B60W 10/06* (2013.01);
(Continued)

(58) Field of Classification Search
None
See application file for complete search history.

(56) References Cited

U.S. PATENT DOCUMENTS

| 4,615,425 A | 10/1986 | Kobayashi et al. |
| 5,807,204 A * | 9/1998 | Shiiba .................. F16H 61/143 |
| | | 477/169 |

(Continued)

FOREIGN PATENT DOCUMENTS

| EP | 1460317 A2 | 9/2004 |
| EP | 2211069 A1 | 7/2010 |

(Continued)

OTHER PUBLICATIONS

Extended European search report dated Jun. 29, 2016 for European patent application No. 15200051.9.

*Primary Examiner* — Dirk Wright
(74) *Attorney, Agent, or Firm* — Rabin & Berdo, P.C.

(57) ABSTRACT

A clutch control system for vehicle is applied to a vehicle having a clutch and a transmission disposed in a power transmission path from an engine to a vehicle wheel. The system includes a first rotational speed detecting unit to detect a driving side rotational speed of the clutch, a second rotational speed detecting unit to detect a driven side rotational speed of the clutch, a half-clutch control unit, and a half-clutch transition control unit. The half-clutch control unit executes a first half-clutch control on the clutch actuator when a gear position of the transmission and a rotational direction of a driven side portion of the clutch are matched and executes, on the clutch actuator, a second half-clutch control, differing from the first half-clutch control, when the gear position of the transmission and the rotational direction of the driven side portion of the clutch are not matched.

25 Claims, 20 Drawing Sheets

(52) U.S. Cl.
CPC ..... *F16D 48/06* (2013.01); *B60W 2510/0241* (2013.01); *B60W 2510/0283* (2013.01); *B60W 2510/0638* (2013.01); *B60W 2510/0657* (2013.01); *B60W 2510/1005* (2013.01); *B60W 2520/10* (2013.01); *B60W 2710/025* (2013.01); *B60W 2710/065* (2013.01); *F16D 2500/1045* (2013.01); *F16D 2500/10412* (2013.01); *F16D 2500/3067* (2013.01); *F16D 2500/30401* (2013.01); *F16D 2500/30415* (2013.01); *F16D 2500/30426* (2013.01); *F16D 2500/30806* (2013.01); *F16D 2500/3115* (2013.01); *F16D 2500/3144* (2013.01); *F16D 2500/7044* (2013.01); *F16D 2500/70404* (2013.01); *F16D 2500/70408* (2013.01)

(56) References Cited

U.S. PATENT DOCUMENTS

| | | | |
|---|---|---|---|
| 6,171,212 B1 | 1/2001 | Reuschel | |
| 6,873,894 B2 * | 3/2005 | Bansbach | B60K 17/3467 701/67 |
| 8,287,433 B2 * | 10/2012 | Kishii | B60W 30/18063 477/181 |
| 9,488,267 B2 * | 11/2016 | Yanakiev | F16H 61/0021 |

FOREIGN PATENT DOCUMENTS

| | | |
|---|---|---|
| JP | H03-69537 U | 7/1991 |
| JP | 2002-021884 A | 1/2002 |
| WO | WO 2005010394 A1 | 2/2005 |

* cited by examiner

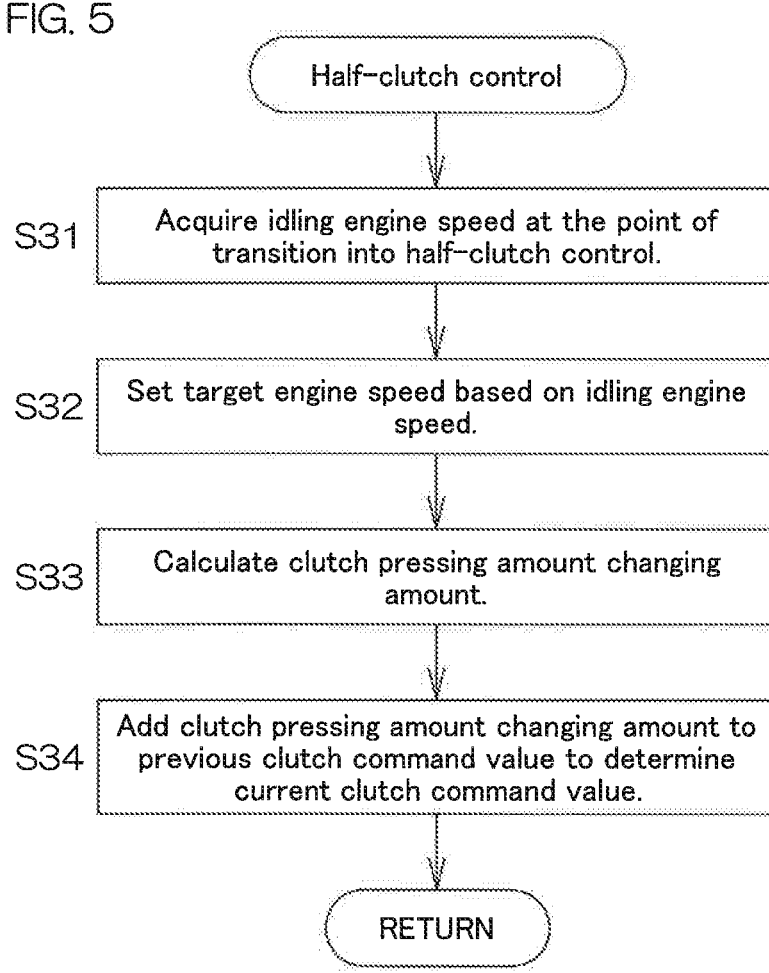

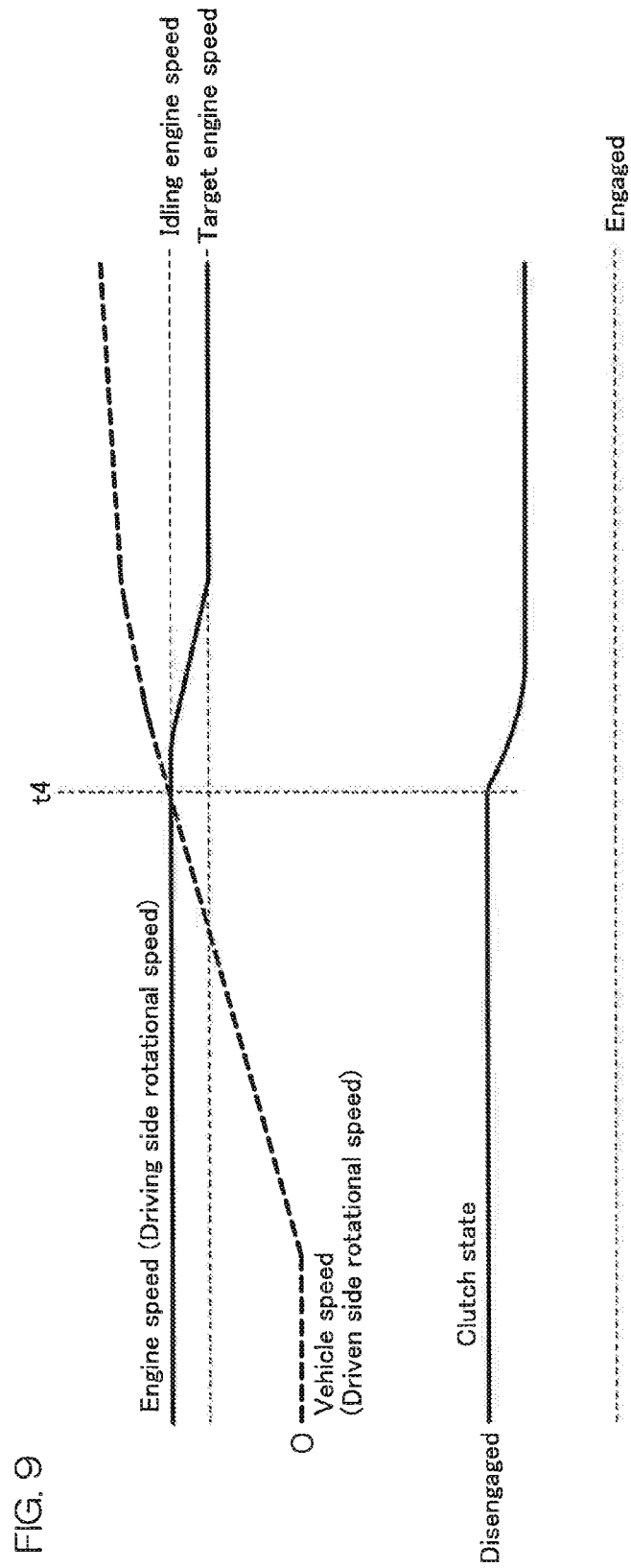

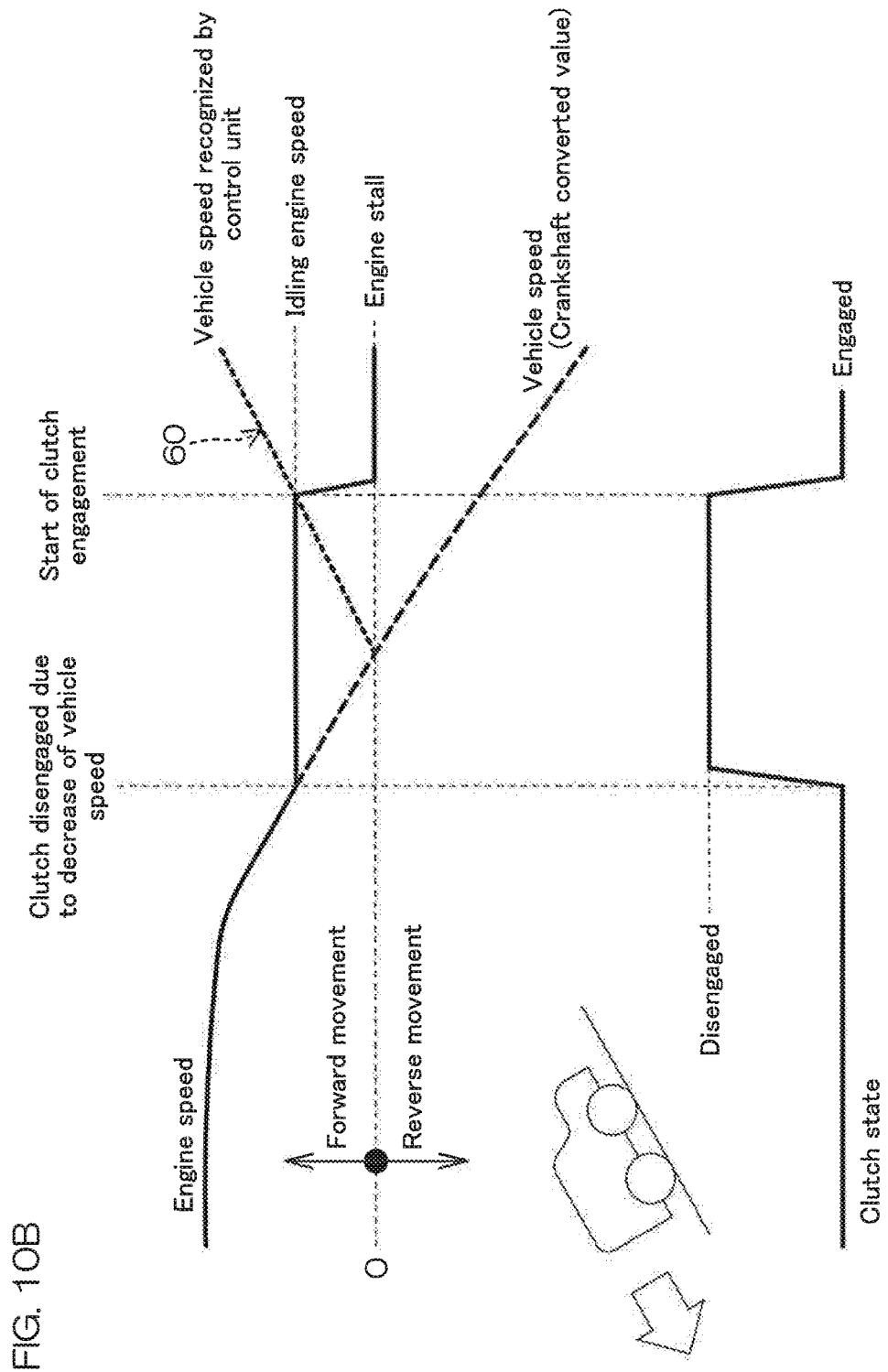

CLUTCH CONTROL SYSTEM FOR VEHICLE

BACKGROUND OF THE INVENTION

1. Field of the Invention

The present invention relates to a clutch control system which may be used in a vehicle in which a clutch and a transmission are disposed in a power transmission path from an engine to a vehicle wheel.

2. Description of the Related Art

Japanese Utility Model Application Publication No. 3-69537 discloses an automatic transmission for automobile. On a downward slope, the automatic transmission engages the clutch immediately to prevent increase of vehicle speed due to coast. Also, on an upward slope, the automatic transmission slidingly engages the clutch gradually while keeping an engine output high. The clutch is thereby engaged while preventing lowering of engine speed.

Japanese Patent Application Publication No. 2002-21884 discloses a clutch controller for vehicle. When a vehicle speed becomes not less than a fixed value in a clutch-disengaged state, the clutch controller engages the clutch to apply engine braking to the vehicle in the free running state (coasting state) to perform deceleration. The vehicle speed is determined from an output signal from an output shaft rotation sensor. The output shaft rotation sensor detects the rotation of an output shaft of a transmission.

U.S. Pat. No. 6,171,212 discloses a clutch control for vehicle. With the control, a target clutch torque is calculated based on an engine speed, a transmission input rotational speed, and a throttle valve position. A clutch actuator is controlled based on the target clutch torque. More specifically, a tentative target clutch torque is calculated based on the engine speed and the transmission input rotational speed. On the other hand, a target engine speed is calculated based on the transmission input rotational speed and the throttle valve position. If the actual engine speed is below the target engine speed, the tentative target clutch torque is corrected to calculate the target clutch torque so that the clutch is moved and adjusted in an opening or disengaging direction. If the actual engine speed exceeds the target engine speed, the tentative target clutch torque is corrected to calculate the target clutch torque so that the clutch is moved and adjusted in a closing or engaging direction.

SUMMARY OF THE INVENTION

The inventor of preferred embodiments of the present invention described and claimed in the present application conducted an extensive study and research regarding a clutch control system for vehicle, such as the one described above, and in doing so, discovered and first recognized new unique challenges and previously unrecognized possibilities for improvements as described in greater detail below.

The inventor of the present invention considered a case where, on an upward slope, reverse movement is performed using gravity while remaining in forward gear and a case where, on a downward slope, forward movement is performed using gravity while remaining in reverse gear.

However, none of Japanese Utility Model Application Publication No. 3-69537, Japanese Patent Application Publication No. 2002-21884, and U.S. Pat. No. 6,171,212 makes any specific mention of such cases.

For example, with the prior art of Japanese Utility Model Application Publication No. 3-69537, as the vehicle speed decreases on an upward slope, the clutch is engaged upon increasing the engine output and a propulsive force in the forward movement direction is increased. The vehicle thus cannot be made to perform reverse movement using gravity while remaining in forward gear.

With the prior art of Japanese Patent Application Publication No. 2002-21884, when on an upward slope, the clutch is disengaged, the vehicle begins to move in reverse due to gravity accordingly, and the vehicle speed becomes not less than the fixed value, the clutch is engaged. However, if the forward gear is selected, an engine stall may occur because an engine side member and a vehicle wheel side member of the clutch are opposite in rotational direction. The vehicle thus cannot be made to perform reverse movement while remaining in the forward gear. It should be noted that an output shaft rotation sensor is ordinarily an inexpensive rotation sensor that detects a rotational amount of the output shaft but not a rotational direction. Therefore if the vehicle performs reverse movement, the vehicle speed calculated based on the output of the output shaft rotation sensor increases.

With the prior art of U.S. Pat. No. 6,171,212, when on an upward slope, the clutch is disengaged, the vehicle starts to move in reverse, and the vehicle speed (vehicle speed in the reverse movement direction) thus increases, the transmission input rotational speed at a position further downstream in the power transmission path than the clutch increases. The target engine speed thus increases while the actual engine speed remains the same and therefore the clutch is moved and adjusted in the opening direction. Therefore, although engine braking cannot be used, it is possible to make the vehicle perform reverse movement using gravity on an upward slope. However, with the prior art of U.S. Pat. No. 6,171,212, even in moving downward (moving forward) on a downward slope, the target engine speed increases while the actual engine speed remains the same and engine braking thus cannot be used.

A preferred embodiment of the present invention thus provides a clutch control system for vehicle, which, while enabling use of engine braking when a gear position of a transmission and a moving direction of a vehicle are matched, enables movement of the vehicle using gravity on a sloping road when the gear position of the transmission and the moving direction of the vehicle are not matched.

Also, a preferred embodiment of the present invention provides a clutch control system for vehicle, which enables use of an engine break regardless of whether or not a gear position of a transmission and a moving direction of a vehicle are matched.

In order to overcome the previously unrecognized and unsolved challenges described above, a preferred embodiment of the present invention provides a clutch control system that is for a vehicle, in which a clutch and a transmission are disposed in a power transmission path from an engine to a vehicle wheel. The clutch has a driving side portion and a driven side portion disposed respectively at the engine side and the vehicle wheel side on the power transmission path and is arranged to perform engagement and disengagement between the driving side portion and the driven side portion by means of a clutch actuator. The transmission is arranged to enable selection among a plurality of gear positions including a forward gear position at which a driving force of the engine is converted to a rotational force in a forward movement direction of the vehicle wheel and a reverse gear position at which the driving force of the engine is converted to a rotational force in a reverse movement direction of the vehicle wheel. The clutch control system includes a first rotational speed detecting unit that detects a driving side rotational speed corresponding to a rotational speed of the driving side portion of the clutch, a second rotational speed detecting unit that detects a driven side rotational speed corresponding to a rotational speed of the driven side portion of the clutch, a target rotational speed setting unit that sets, as a target rotational speed corresponding to full accelerator closure, a value lower than a value equivalent to an idling engine speed of the engine, a half-clutch control unit programmed to control the clutch actuator so as to increase a mutually pressing force of the driving side portion and the driven side portion of the clutch if the driving side rotational speed is higher than the target rotational speed and so as to decrease the pressing force if the driving side rotational speed is lower than the target rotational speed, and a half-clutch transition control unit programmed to perform transition to half-clutch control by the half-clutch control unit when at least one condition among a first condition that the driven side rotational speed is higher than the driving side rotational speed and a second condition that the driven side rotational speed is not less than a predetermined value is met when the clutch is in the disengaged state.

The clutch is capable of taking on a disengaged state, an engaged state, and a half-clutch state. In the disengaged state, the driving side portion and the driven side portion are disengaged from each other and torque is not transmitted therebetween. In the engaged state, the driving side portion and the driven side portion are coupled without sliding and torque is transmitted therebetween. The half-clutch state is an intermediate state between the engaged state and the disengaged state. In the half-clutch state, the driving side portion and the driven side portion are in sliding contact with each other and torque is transmitted partially therebetween.

When the clutch is in the disengaged state, the power transmission path between the vehicle wheel and the engine is interrupted and the vehicle is thus capable of coasting. Coasting is the traveling of the vehicle in a state where the power transmission path is interrupted. Ordinarily when the vehicle coasts, it is in a state of full accelerator closure, which means that no acceleration is provided by the accelerator.

With the preferred embodiment, when one of either or both of the first condition that the driven side rotational speed is higher than the driving side rotational speed and the second condition that the driven side rotational speed is not less than the predetermined value is or are met due to coasting of the vehicle, the half-clutch control is started. In the half-clutch control, the mutually pressing force of the driving side portion and the driven side portion is increased if the driving side rotational speed is higher than the target rotational speed. On the other hand, the pressing force is decreased if the driving side rotational speed is lower than the target rotational speed. Control of the pressing force is achieved by control of the clutch actuator. Therefore by controlling the clutch actuator, the driving side rotational speed is adjusted to the target rotational speed. The target rotational speed corresponding to full accelerator closure is set to a value lower than the idling engine speed equivalent value.

A case where the vehicle moves downward (moves forward) on a downward slope with the gear position of the transmission being the forward gear position in the full accelerator closure and clutch-disengaged state shall now be considered. As the driven side rotational speed increases in accompaniment with the increase of the vehicle speed, the half-clutch control is started. Due to gravity acting on the vehicle, a torque that promotes the rotation of the driving side portion is transmitted from the driven side portion to the driving side portion. A state in which the driving side rotational speed is higher than the target rotational speed is thereby sustained and therefore the clutch quickly reaches the engaged state via the half-clutch state. In the engaged state, the engine, which is in the full accelerator closure state, generates a braking force that suppresses forward rotation of the vehicle wheel. Forward movement down the downward slope can thus be performed using gravity while applying engine braking.

The operation is the same in a case where the vehicle moves downward (moves in reverse) on an upward slope with the gear position of the transmission being the reverse gear position in the full accelerator closure and clutch-disengaged state. That is, in the half-clutch state, a torque that promotes the rotation of the engine is transmitted from the driven side portion to the driving side portion, and therefore the clutch quickly reaches the engaged state. Reverse movement down the upward slope can thereby be performed using gravity while applying engine braking.

Next, a case where the vehicle moves downward (moves in reverse) on an upward slope with the gear position of the transmission being the forward gear position in the full accelerator closure and clutch-disengaged state shall now be considered. As the driven side rotational speed increases in accompaniment with the increase of the vehicle speed, the half-clutch control is started. Due to the gravity acting on the vehicle, a torque is transmitted from the driven side portion to the driving side portion. However, the vehicle is moving in reverse at the forward gear position and therefore the transmitted torque is a torque in a direction of tending to stop the rotation of the engine. A state where the driving side rotational speed is lower than the target rotational speed is reached and accordingly, the clutch actuator is controlled to weaken the pressing force between the driving side portion and the driven side portion. By the weakening of the pressing force, the torque transmitted between the driving side portion and the driven side portion decreases. The engine speed then increases and tends to return to the idling engine speed and therefore the driving side rotational speed surpasses the target rotational speed that is set lower than the idling engine speed equivalent value. The clutch actuator is consequently controlled to increase the pressing force between the driving side portion and the driven side portion. By repetition of such operations, the half-clutch state is sustained and increase of the rotational speed of the driven side portion of the clutch is suppressed by the driving force of the engine. That is, reverse movement using gravity on the upward slope can thus be performed while remaining in forward gear and while applying engine braking and avoiding engine stall.

The operation is the same in a case where the vehicle moves downward (moves forward) on a downward slope with the gear position of the transmission being the reverse gear position in the full accelerator closure and clutch-disengaged state. That is, in the half-clutch state, a torque in a direction of stopping the rotation of the engine is transmitted from the driven side portion to the driving side portion, and therefore the clutch actuator repeats the operations of increasing and decreasing the pressing force to keep the target rotational speed. Forward movement using gravity on the downward slope can thereby be performed with the reverse gear being maintained and while applying engine braking and avoiding engine stall.

In a preferred embodiment of the present invention, the target rotational speed setting unit sets a value, higher than a value equivalent to a lower limit engine speed at which the engine can be kept running, as the target rotational speed corresponding to full accelerator closure.

With the present arrangement, the target rotational speed corresponding to full accelerator closure is higher than the value equivalent to the lower limit engine speed at which the engine can be kept running (in other words, at which engine stall does not occur). Movement down a slope using gravity can thus be performed while applying engine braking and avoiding engine stall regardless of the gear position being the forward gear position or the reverse gear position.

In a preferred embodiment of the present invention, the target rotational speed setting unit sets the target rotational speed variably in accordance with the idling engine speed when the half-clutch transition control unit performs the transition to the half-clutch control. With the present arrangement, the target rotational speed is not fixed but is dependent on the idling engine speed when the transition to the half-clutch control occurs. For example, the idling engine speed may vary in accordance with a parameter, such as intake air temperature, oil temperature, whether or not starting has just been performed, engine temperature, etc. An appropriate target rotational speed is set variably in accordance with such variation of the idling engine speed. Movement down a slope using gravity can thereby be performed while applying engine braking and reliably avoiding engine stall regardless of the gear position being the forward gear position or the reverse gear position.

In a preferred embodiment of the present invention, the half-clutch control unit is programmed to variably set a changing amount of the pressing force in accordance with a difference between the driving side rotational speed and the target rotational speed. With the present arrangement, the pressing force is increased or decreased in accordance with the difference between the driving side rotational speed and the target rotational speed and therefore an appropriate pressing force can be attained, especially in a case of moving down a slope in a state where the gear position and the travel direction of the vehicle are not matched. The difference between the driving side rotational speed and the target rotational speed may be a deviation of the driving side rotational speed with respect to the target rotational speed (=driving side rotational speed−target rotational speed).

In a preferred embodiment of the present invention, the half-clutch control unit is programmed to set the changing amount to be larger the larger the difference. With the present arrangement, the larger the difference, the larger the changing amount that is set and an appropriate pressing force can thereby be realized quickly. Movement down a slope using gravity can thus be performed in a state of generating an appropriate engine braking force while avoiding engine stall.

Another preferred embodiment of the present invention provides a clutch control system for vehicle including a first rotational speed detecting unit that detects a driving side rotational speed corresponding to a rotational speed of a driving side portion of a clutch, a second rotational speed detecting unit that detects a driven side rotational speed corresponding to a rotational speed of a driven side portion of the clutch, a target clutch torque setting unit that sets, as a target clutch torque corresponding to full accelerator closure, a value greater than a value equivalent to an engine torque generated by an engine at an idling engine speed and less than a value equivalent to an engine torque generated by the engine at a predetermined engine speed lower than the idling engine speed, a clutch torque acquisition unit that acquires an actual clutch torque transmitted from the driving side portion to the driven side portion, a half-clutch control unit programmed to control the clutch actuator so as to increase a mutually pressing force of the driving side portion and the driven side portion of the clutch if the actual clutch torque is lower than the target clutch torque and so as to decrease the pressing force if the actual clutch torque is higher than the target clutch torque, and a half-clutch transition control unit programmed to perform transition to half-clutch control by the half-clutch control unit when one of either or both of a first condition that the driven side rotational speed is higher than the driving side rotational speed and a second condition that the driven side rotational speed is not less than a predetermined value is or are met when the clutch is in the disengaged state.

With the present preferred embodiment, when at least one condition among the first condition that the driven side rotational speed is higher than the driving side rotational speed and the second condition that the driven side rotational speed is not less than the predetermined value is met due to coasting of the vehicle, the half-clutch control is started. In the half-clutch control, the mutually pressing force of the driving side portion and the driven side portion is increased if the actual clutch torque is lower than the target clutch torque. On the other hand, the pressing force is decreased if the actual clutch torque is greater than the target clutch torque. Control of the pressing force is achieved by control of the clutch actuator. Therefore by controlling the clutch actuator, the actual clutch torque is adjusted to the target clutch torque. The target clutch torque corresponding to full accelerator closure is set to a value equivalent to the engine torque generated by the engine at a rotational speed lower than the idling engine speed equivalent value.

The clutch torque is the torque that is transmitted from the driving side portion to the driven side portion, with a positive sign being assigned to a value in a direction equivalent to a rotational direction of the engine and a negative sign being assigned to a value in a direction equivalent to the direction opposite the rotational direction of the engine. A case of being in the state of full accelerator closure with the clutch being in the engaged state shall now be considered. When the engine speed is lower than the idling engine speed, the engine tends to increase the engine speed toward the idling engine speed. In the process, the driving side portion generates a torque that accelerates the rotation of the driven side portion. The clutch torque in the process takes on a positive sign. On the other hand, when the engine speed is higher than the idling engine speed, the engine tends to decrease the engine speed toward the idling engine speed. In the process, the driving side portion generates a torque that decelerates the rotation of the driven side portion. The clutch torque in the process takes on a negative sign.

A case where the vehicle moves downward (moves forward) on a downward slope with the gear position of the transmission being the forward gear position in the full accelerator closure and clutch-disengaged state shall now be considered. As the driven side rotational speed increases in accompaniment with the increase of the vehicle speed, the half-clutch control is started. Due to the gravity acting on the vehicle, a torque that promotes the rotation of the driving side portion is transmitted from the driven side portion to the driving side portion. The engine speed thus becomes higher than the idling engine speed and a state where the torque transmitted from the driving side to the driven side, that is, the actual clutch torque is negative is entered. A state in which the actual clutch torque is lower than the target clutch torque is thereby sustained and therefore the clutch actuator is controlled to increase the pressing force. Therefore the clutch quickly reaches the engaged state via the half-clutch state. In the engaged state, the engine, which is in the full accelerator closure state, generates a braking force that suppresses forward rotation of the vehicle wheel. Forward movement down the downward slope can thus be performed using gravity while applying engine braking.

The operation is the same in a case where the vehicle moves downward (moves in reverse) on an upward slope with the gear position of the transmission being the reverse gear position in the full accelerator closure and clutch-disengaged state. That is, in the half-clutch state, a torque that promotes the rotation of the engine is transmitted from the driven side portion to the driving side portion, and therefore the state in which the actual clutch torque is lower than the target clutch torque is sustained. The clutch thus quickly reaches the engaged state. Reverse movement down the upward slope can thereby be performed using gravity while applying engine braking.

Next, a case where the vehicle moves downward (moves in reverse) on an upward slope with the gear position of the transmission being the forward gear position in the full accelerator closure and clutch-disengaged state shall now be considered. As the driven side rotational speed increases in accompaniment with the increase of the vehicle speed, the half-clutch control is started. Due to the gravity acting on the vehicle, a torque is transmitted from the driven side portion to the driving side portion. However, the vehicle is moving in reverse at the forward gear position and therefore the transmitted torque is a torque in the direction of tending to stop the rotation of the engine. A state where the engine speed is lower than the idling engine speed is entered and the engine tends to return to the idling engine speed. Therefore, the torque transmitted from the driving side to the driven side, that is, the actual clutch torque takes on a positive value and exceeds the target clutch torque. Accordingly, the clutch actuator is controlled to weaken the pressing force between the driving side portion and the driven side portion and engine stall is avoided. On the other hand, by the weakening of the pressing force, the actual clutch torque transmitted between the driving side portion and the driven side portion decreases. When the actual clutch torque thus falls below the target clutch torque, the clutch actuator is controlled to increase the pressing force between the driving side portion and the driven side portion. By repetition of such operations, the half-clutch state is sustained and increase of the rotational speed of the driven side portion of the clutch is suppressed by the driving force of the engine. That is, reverse movement using gravity on the upward slope can thus be performed with the forward gear being maintained and while applying engine braking and avoiding engine stall.

The operation is the same in a case where the vehicle moves downward (moves forward) on a downward slope with the gear position of the transmission being the reverse gear position in the full accelerator closure and clutch-disengaged state. That is, in the half-clutch state, a torque in the direction of stopping the rotation of the engine is transmitted from the driven side portion to the driving side portion, and therefore the clutch actuator repeats the operations of increasing and decreasing the pressing force to keep the target clutch torque. Forward movement using gravity on the downward slope can thereby be performed with the reverse gear being maintained and while applying engine braking and avoiding engine stall.

In a preferred embodiment of the present invention, the target clutch torque setting unit sets, as the target clutch torque corresponding to full accelerator closure, a value equivalent to the engine torque generated by the engine at an engine speed higher than a lower limit engine speed at which the engine can be kept running. In other words, the target clutch torque setting unit sets, as the target clutch torque corresponding to full accelerator closure, a value less than a value equivalent to the engine torque generated by the engine at the lower limit engine speed at which the engine can be kept running.

With the present arrangement, the target clutch torque corresponding to full accelerator closure is less than the value equivalent to the engine torque at the lower limit engine speed at which the engine can be kept running Movement down a slope using gravity can thus be performed while applying engine braking and avoiding engine stall regardless of the gear position being the forward gear position or the reverse gear position.

In a preferred embodiment of the present invention, the target clutch torque setting unit sets the target clutch torque variably in accordance with the idling engine speed when the half-clutch transition control unit performs the transition to the half-clutch control. With the present arrangement, the target clutch torque is not fixed but is dependent on the idling engine speed when the transition to the half-clutch control occurs. For example, the idling engine speed may vary in accordance with a parameter, such as intake air temperature, oil temperature, whether or not starting has just been performed, engine temperature, etc. An appropriate target clutch torque is set variably in accordance with such variation of the idling engine speed. Movement down a slope using gravity can thereby be performed while applying engine braking and reliably avoiding engine stall regardless of the gear position being the forward gear position or the reverse gear position.

In a preferred embodiment of the present invention, the half-clutch control unit is programmed to variably set a changing amount of the pressing force in accordance with a difference between the actual clutch torque and the target clutch torque. With the present arrangement, the pressing force is increased or decreased in accordance with the difference between the actual clutch torque and the target clutch torque and therefore an appropriate pressing force can be attained, especially in a case of moving down a slope in a state where the gear position and the travel direction of the vehicle are not matched. The difference between the actual clutch torque and the target clutch torque may be a deviation of the target clutch torque with respect to the actual clutch torque (=target clutch torque−actual clutch torque).

In a preferred embodiment of the present invention, the half-clutch control unit is programmed to set the changing amount to be larger the larger the difference. With the present arrangement, the larger the difference, the larger the changing amount that is set and an appropriate pressing force can thereby be realized quickly. Movement down a slope using gravity can thus be performed in a state of generating an appropriate engine braking force while avoiding engine stall.

In a preferred embodiment of the present invention, the second rotational speed detecting unit includes a rotational pulse generating unit that generates, in accordance with rotation of one rotational shaft between the driven side portion of the clutch and the vehicle wheel, rotational pulses that are not related to rotational direction but are in accordance with rotational amount. With the present arrangement, the driven side rotational speed detected by the second rotational speed detecting unit does not include information related to the rotational direction. That is, the second rotational speed detecting unit is arranged using the inexpensive rotational pulse generating unit that does not output information related to the rotational direction. Even with such an inexpensive arrangement, movement down a slope using gravity can be performed while applying engine braking and avoiding engine stall regardless of the gear position. This is because, as described above, the arrangement that controls the pressing force of the clutch by comparing the driving side rotational speed and the target rotational speed is capable of actuation independent of whether or not the gear position and the travel direction of the vehicle are matched. This is also because the arrangement that controls the pressing force of the clutch by comparing the actual clutch torque and the target clutch torque is similarly capable of actuation independent of whether or not the gear position and the travel direction of the vehicle are matched.

Yet another preferred embodiment of the present invention provides a clutch control system for vehicle including a first rotational speed detecting unit that detects a driving side rotational speed corresponding to a rotational speed of a driving side portion of a clutch, a second rotational speed detecting unit that detects a driven side rotational speed corresponding to a rotational speed of a driven side portion of the clutch, a half-clutch control unit programmed to execute a first half-clutch control on the clutch actuator when a gear position of a transmission and a rotational direction of the driven side portion of the clutch are matched and to execute, on the clutch actuator, a second half-clutch control, differing from the first half-clutch control, when the gear position of the transmission and the rotational direction of the driven side portion of the clutch are not matched, and a half-clutch transition control unit programmed to perform transition to half-clutch control by the half-clutch control unit when one of either or both of a first condition that the driven side rotational speed is higher than the driving side rotational speed and a second condition that the driven side rotational speed is not less than a predetermined value is or are met when the clutch is in the disengaged state.

With the present arrangement, when one of either or both of the first condition that the driven side rotational speed is higher than the driving side rotational speed and the second condition that the driven side rotational speed is not less than the predetermined value is or are met due to coasting of the vehicle, the half-clutch control is started. The half-clutch control is the first half-clutch control if the gear position of the transmission and the rotational direction of the driven side portion are matched and is the second half-clutch control if these are not matched. Appropriate half-clutch control can be executed in accordance with the matching/non-matching of the gear position and the rotational direction of the driven side portion.

The first half-clutch control may be a control of monotonously increasing the pressing force between the driving side portion and the driven side portion to induce transition from the half-clutch state to the engaged state and maintain the engaged state. Engine braking can thereby be applied. The second half-clutch control may be a control of increasing and decreasing the pressing force of the driving side portion and the driven side portion to maintain the half-clutch state. Rotation of a vehicle wheel can thereby be suppressed by rotation of an engine while avoiding engine stall. Engine braking can thus be used while avoiding engine stall without dependence on the matching/non-matching of the gear position and the rotational direction of the driven side portion.

In a preferred embodiment of the present invention, the clutch control system further includes a gear position acquisition unit that acquires gear position information of the transmission and a forward/reverse movement determining unit determining whether the vehicle wheel is rotating in the forward movement direction or is rotating in the reverse movement direction. Also, the half-clutch control unit is programmed to execute the first half-clutch control if the acquired gear position information indicates the forward gear position and it is determined that the vehicle wheel is rotating in the forward movement direction or if the acquired gear position information indicates the reverse gear position and it is determined that the vehicle wheel is rotating in the reverse movement direction. Also, the half-clutch control unit is programmed to execute the second half-clutch control if the acquired gear position information indicates the forward gear position and it is determined that the vehicle wheel is rotating in the reverse movement direction or if the acquired gear position information indicates the reverse gear position and it is determined that the vehicle wheel is rotating in the forward movement direction.

With the present arrangement, the gear position is acquired by the gear position acquisition unit and the rotational direction of the vehicle wheel is determined by the forward/reverse movement determining unit. If the gear position and the vehicle wheel rotational direction are matched, the first half-clutch control is executed and if these are unmatched, the second half-clutch control is executed. Appropriate half-clutch control can thus be executed in accordance with the matching/non-matching of the gear position and the vehicle wheel rotational direction.

In a preferred embodiment of the present invention, the forward/reverse movement determining unit includes a rotational direction sensor made integral to the second rotational speed detecting unit. With the present arrangement, the vehicle wheel rotational direction can be detected without an increase in units. Appropriate half-clutch control can thus be executed in accordance with the matching/non-matching of the gear position and the rotational direction of the driven side portion without causing a significant cost increase.

In a preferred embodiment of the present invention, the second half-clutch control includes a control of driving the clutch actuator to keep the clutch in the disengaged state. With the present arrangement, when the gear position and the rotational direction of the driven side portion are unmatched, the clutch is kept in the disengaged state so that occurrence of engine stall due to torque input from the driven side portion can be avoided. Movement down a slope using gravity can thus be performed while avoiding engine stall even in a state where the gear position and the rotational direction of the driven side portion are unmatched.

In a preferred embodiment of the present invention, the second half-clutch control includes a control of driving the clutch actuator so that the driving side portion and the driven side portion are pressed against each other by a weak pressing force therebetween in comparison to the first half-clutch control. With the present arrangement, the pressing force of the driving side portion and the driven side portion are weakened when the gear position and the rotational direction of the driven side portion are unmatched, and therefore input of the torque, input from the driven side portion, into the engine is restricted. Engine stall can thereby be avoided. Movement down a slope using gravity can thus be performed while avoiding engine stall.

In a preferred embodiment of the present invention, the first half-clutch control includes a control of driving the clutch actuator to vary the pressing force in accordance with the driven side rotational speed and the second half-clutch control includes a control of driving the clutch actuator to vary the pressing force in accordance with the driven side rotational speed and generate a pressing force less than the pressing force generated by the first half-clutch control for the same driven side rotational speed.

With the present arrangement, appropriate half-clutch control can be performed in accordance with the driven side rotational speed. The pressing force of the driving side portion and the driven side portion is made smaller when the gear position and the vehicle wheel rotational direction are unmatched than when these are matched. Half-clutch control can thereby be performed while avoiding engine stall and therefore movement down a slope using gravity can be performed.

In a preferred embodiment of the present invention, the second half-clutch control includes a control of driving the clutch actuator to generate a pressing force not more than an upper limit pressing force that is less than a pressing force by which the clutch is put in the engaged state. With the present arrangement, in the second half-clutch control that is performed when the gear position and the vehicle wheel rotational direction are unmatched, the clutch actuator is controlled so that the clutch is not put in the engaged state. Torque transmission between the engine and the vehicle wheel can thereby be performed while avoiding engine stall. Movement down a slope using gravity can thus be performed while applying engine braking.

In a preferred embodiment of the present invention, the clutch control system for vehicle further includes a disengagement control unit that controls the clutch actuator to disengage the clutch when the driven side rotational speed is not more than a predetermined value. With the present arrangement, when the vehicle decelerates and the driven side rotational speed becomes not more than the predetermined value, the clutch is disengaged. Excessive decrease of the engine speed can thereby be avoided and engine stall can be avoided through the automatic disengagement of the clutch.

In a preferred embodiment of the present invention, the driven side rotational speed is equivalent to the vehicle speed of the vehicle. With the present arrangement, the driven side rotational speed corresponds to the vehicle speed and therefore half-clutch control that is in accordance with the vehicle speed is made possible. The vehicle speed may be used as the driven side rotational speed or another index corresponding to the vehicle speed may be used.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 5 is a flowchart for describing a specific example of half-clutch control.

FIG. 9 shows an operation example of a case of moving downward (moving in reverse) by coasting on an upward slope in a state where the gear position of the transmission is set to a forward gear position.

FIG. 10A and FIG. 10B are diagrams for describing operations by the arrangement of a comparative example.

DETAILED DESCRIPTION OF THE PREFERRED EMBODIMENTS

The form and application of a vehicle to which preferred embodiments of the present invention are applied are not restricted in particular. One category of vehicles with which the preferred embodiments of the present invention are especially useful is the category of utility vehicles. The preferred embodiments of the present invention are particularly useful in four-wheel-drive, all-terrain vehicles called "recreational off-highway vehicles." A utility vehicle may be used for travel on rough terrain. With the present category of vehicles, there are cases of moving down a downward slope using gravity while applying engine braking and cases of giving up on climbing up a steep upward slope and moving down the upward slope using gravity. Depending on the case, climbing or moving down on a slope may be performed in reverse gear.

Figure 1:
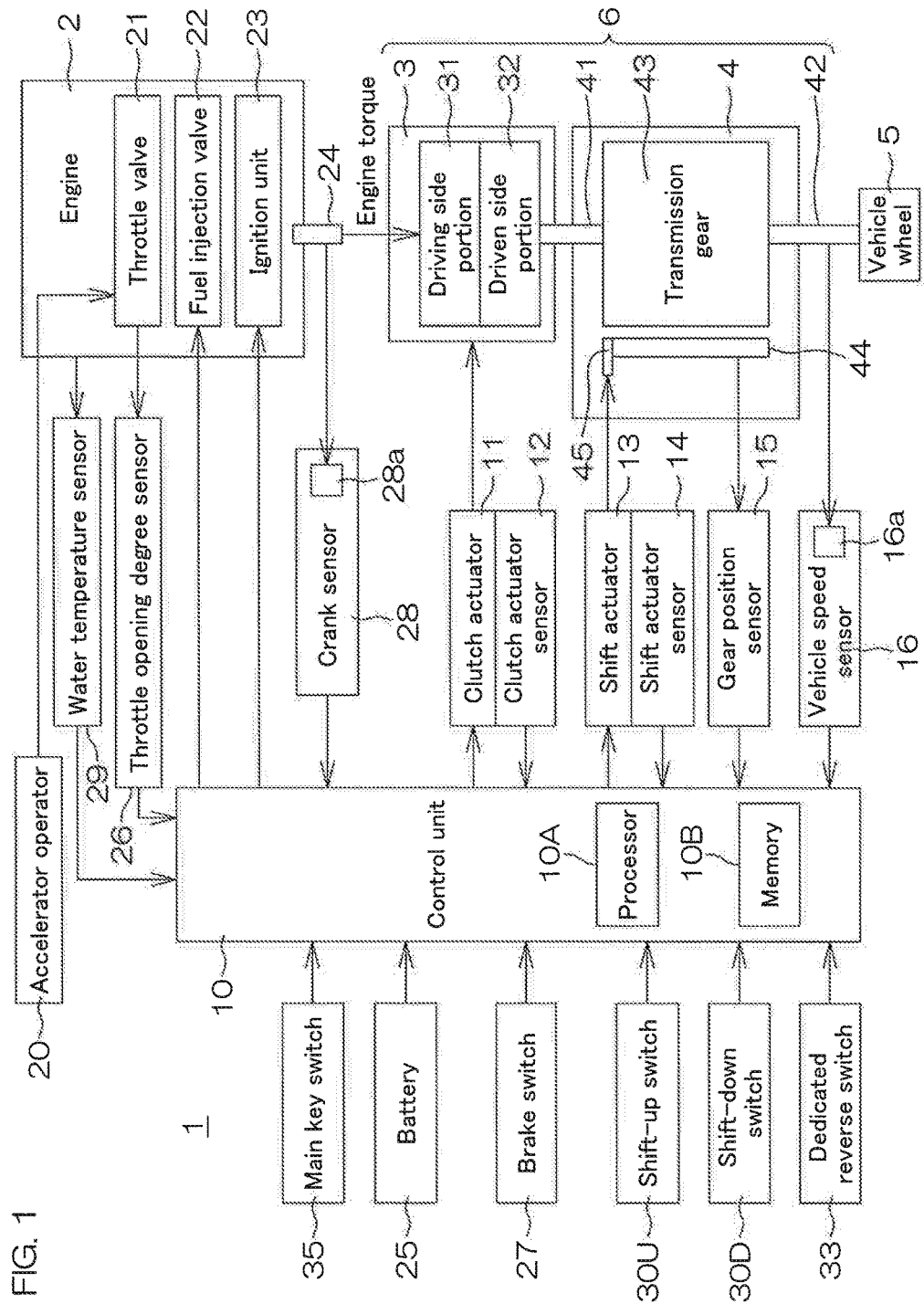
FIG. 1 is a block diagram of the arrangement of principal portions of a vehicle that includes a clutch control system according to a preferred embodiment of the present invention.

FIG. 1 is a block diagram of the arrangement of principal portions of a vehicle 1 that includes a clutch control system according to a preferred embodiment of the present invention. The vehicle 1 includes an engine (internal combustion engine) 2, a clutch 3, a transmission 4, and a vehicle wheel 5. A driving force generated by the engine 2 is transmitted to the vehicle wheel 5 via a power transmission path 6. The clutch 3 and the transmission 4 are disposed in the power transmission path 6. In the present preferred embodiment, the clutch 3 is disposed between the engine 2 and the transmission 4.

The engine 2 includes a throttle valve 21, a fuel injection valve 22, and an ignition unit 23. An accelerator operator 20, operated by a driver, is coupled to the throttle valve 21. There is thus a correspondence between the operation amount of the accelerator operator 20 (accelerator opening degree) and a throttle opening degree. The accelerator operator 20 may be an accelerator pedal. The fuel injection valve 22 injects fuel of an injection amount set according to the accelerator opening degree, etc., into the engine 2. The ignition unit 23 generates a spark discharge inside the engine 2 at a predetermined ignition timing in an engine cycle to ignite a mixed gas of the fuel and air.

The clutch 3 includes a driving side portion 31 and a driven side portion 32, and the driving side portion 31 and the driven side portion 32 are arranged to approach and separate from each other. A torque (engine torque) generated by the engine 2 is input into the driving side portion 31. More specifically, rotation of a crankshaft 24 of the engine 2 is transmitted to the driving side portion 31. A reduction gear may be provided between the crankshaft 24 and driving side portion 31. The driven side portion 32 is coupled to a main shaft 41 of the transmission 4.

The transmission 4 includes the main shaft 41, a drive shaft 42, a plurality of transmission gears 43, a shift cam 44, and a shifter 45. The plurality of transmission gears 43 can be positioned at a plurality of gear positions. The plurality of gear positions include at least one forward gear position and at least one reverse gear position. Rotation of the main shaft 41 is converted to rotation of a shift ratio and direction that are in accordance with the gear position, and transmitted to the drive shaft 42. The drive shaft 42 is mechanically coupled to the vehicle wheel 5. The shifter 45 is an operating member that operates the shift cam 44. The positioning of the transmission gears 43 can be changed by displacement (for example, rotational displacement) of the shift cam 44, and the gear position can be selected thereby.

The vehicle 1 further includes a clutch actuator 11, a shift actuator 13, and a control unit 10. The control unit 10 is programmed to control the clutch actuator 11 and the shift actuator 13. The actuators 11 and 13 may be electric actuators or hydraulic actuators. The control unit 10 includes a processor (CPU) 10A and memory 10B. The processor 10A executes a program stored in the memory 10B, whereby the control unit 10 acts as a plurality of functional units as described later. That is, the control unit 10 may include non-transitory, tangible elements.

The control unit 10 in some embodiments may be implemented as a known general-purpose digital signal processor or dedicated signal processing circuit. In some embodiments, the control unit 10 may be a single processor. Such a single processor executes pre-loaded computer program to perform various processes; by performing the processes simultaneously or sequentially, the processor functions as different components; each function of the processor implemented by such a process is described as a separate unit. The control unit 10 may include several processors which operate similarly to the processor described above. The control unit 10 may include integrated circuit devices and memories mounted on a substrate or substrates. Further, the control unit 10 may be part of a computer which has other functional blocks. What is important for the operation of the control unit 10 is that it is constructed so as to execute the described operations, and the hardware of the control unit 10 itself may be known to a person of ordinary skill in the art. It will be understood that other units may be similarly formed to as described above.

The clutch actuator 11 makes the driving side portion 31 and the driven side portion 32 of the clutch 3 approach and separate from each other. The clutch actuator 11 is further arranged to increase and decrease a mutual pressing force of the driving side portion 31 and the driven side portion 32 in a state where these are in contact. The driving side portion 31 and the driven side portion 32 are thereby put in frictional contact and a torque transmitted therebetween is increased and decreased.

The clutch 3 is capable of taking on a disengaged state, an engaged state, and a half-clutch state. In the disengaged state, the driving side portion 31 and the driven side portion 32 are disengaged from each other and torque is not transmitted therebetween. In the engaged state, the driving side portion 31 and the driven side portion 32 are coupled without sliding and torque is transmitted therebetween. The half-clutch state is an intermediate state between the engaged state and the disengaged state. In the half-clutch state, the driving side portion 31 and the driven side portion 32 are in sliding contact with each other and torque is transmitted partially therebetween. By controlling the clutch actuator 11, the state of the clutch 3 can be changed among the disengaged state, half-clutch state, and engaged state, and the pressing force of the driving side portion 31 and the driven side portion 32 in the half-clutch state can be changed.

A clutch actuator sensor 12 is provided to detect a position of an actuating element of the clutch actuator 11. The position of the actuating element of the clutch actuator 11 corresponds to a distance between the driving side portion 31 and the driven side portion 32 of the clutch. In the state where the driving side portion 31 and the driven side portion 32 are in contact, the distance corresponds to the pressing force of the driving side portion 31 and the driven side portion 32.

In the following description, a "clutch pressing amount" shall be introduced as a parameter for collectively referring to the distance between the driving side portion 31 and the driven side portion 32 and the pressing force therebetween. The clutch pressing amount is smaller the larger the distance between the driving side portion 31 and the driven side portion 32, and is larger the smaller the distance between the driving side portion 31 and the driven side portion 32. In the state where the driving side portion 31 and the driven side portion 32 are in contact, the greater the mutual pressing force, the greater the clutch pressing amount.

Specifically, the clutch pressing amount corresponds to the distance between the driving side portion 31 and the driven side portion 32 and more specifically corresponds to a displacement amount of the actuating element of the clutch actuator 11. The control unit 10 drives the clutch actuator 11 based on an output signal of the clutch actuator sensor 12 to control the clutch pressing amount.

The shift actuator 13 actuates the shifter 45 to operate the shift cam 44 and thereby executes a shift operation for changing the gear position. A shift actuator sensor 14 is provided to detect a position of an actuating element of the shift actuator 13. The position of the actuating element of the shift actuator 13 corresponds to a position of the shifter 45. The control unit 10 controls the shift actuator 13 based on an output signal from the shift actuator sensor 14.

The transmission 4 includes a gear position sensor 15 that detects the gear position and a vehicle speed sensor 16 that detects a vehicle speed. Output signals of these sensors are input into the control unit 10.

The gear position sensor 15 detects the gear position of the transmission 4. Specifically, the gear position sensor 15 may be a sensor that detects a position (for example, a rotational position) of the shift cam 44.

The vehicle speed sensor 16 detects a rotational speed of the vehicle wheel 5. For example, the vehicle speed sensor 16 may be a sensor that detects a rotational speed of the drive shaft 42. The rotational speed of the drive shaft 42 is proportional to the rotational speed of the vehicle wheel 5 and the rotational speed of the vehicle wheel 5 can thus be detected by detecting the rotational speed of the drive shaft 42. The rotational speed of the vehicle wheel 5 corresponds to the vehicle speed and the rotational speed of the drive shaft 42 can thus be used as an index that expresses the vehicle speed. The rotational speed of the drive shaft 42 and a rotational speed of the driven side portion 32 of the clutch 3 are in a correspondence based on a transmission gear ratio at the transmission 4. The vehicle speed sensor 16 that detects the rotational speed of the drive shaft 42 is thus an example of a second rotational speed detecting unit that detects a driven side rotational speed that is the rotational speed of the driven side portion 32.

More specifically, the vehicle speed sensor 16 includes a rotational pulse generating unit 16a that generates, in accordance with the rotation of the drive shaft 42, rotational pulses that are not related to rotational direction but are in accordance with rotational amount. The rotational pulses generated by the rotational pulse generating unit 16a are input into the control unit 10. The control unit 10 may, for example, count the rotational pulses input per unit time and calculate the vehicle speed based on the counting result. Also, the control unit 10 may measure a duration required for input of a plurality of rotational pulses of a predetermined number and calculate the vehicle speed based on the measured duration.

A main key switch 35, a battery 25, a throttle opening degree sensor 26, a brake switch 27, a crank sensor 28, a water temperature sensor 29, a shift-up switch 30U, a shift-down switch 30D, a dedicated reverse switch 33, etc., are connected to the control unit 10.

The main key switch 35 is a key switch with which a conduct/interrupt operation using a main key is performed to turn on power to the vehicle 1. The battery 25 supplies electric power to the control unit 10 and other electric components. The control unit 10 monitors a voltage of the battery 25.

The throttle opening degree sensor 26 detects the throttle opening degree of the engine 2. The accelerator operator 20 is coupled to the throttle valve 21 of the engine 2 and therefore there is a correspondence between an operation amount (accelerator opening degree) of the accelerator operator 20 and the throttle opening degree. The throttle opening degree sensor 26 thus also functions as an accelerator opening degree sensor that detects the operation amount of the accelerator operator 20. The water temperature sensor 29 detects a temperature of cooling water of the engine 2.

The crank sensor 28 is a sensor that detects the rotation of the crankshaft 24 of the engine 2. The crank sensor 28 includes, for example, a rotational pulse generating unit 28a that generates, in accordance with the rotation of the crankshaft 24, rotational pulses that are not related to its rotational direction but are in accordance with its rotational amount.

The control unit 10 determines an engine speed based on the rotational pulses generated by the crank sensor 28. The engine speed is a value corresponding to a rotational speed of the driving side portion 31 of the clutch 3. The clutch sensor 28 is thus an example of a first rotational speed detecting unit that detects a driving side rotational speed that is the rotational speed of the driving side portion 31.

The shift-up switch 30U is a switch that is operated by the driver to shift the gear position (shift stage) of the transmission 4 one stage to a higher speed side. The shift-down switch 30D is a switch that is operated by the driver to shift the gear position (shift stage) of the transmission 4 one stage to a lower speed side. Output signals of the shift switches 30U and 30D are input into the control unit 10. In accordance with the input from the shift switch 30U or 30D, the control unit 10 drives the clutch actuator 11 and the shift actuator 13 to perform a shifting operation and change the gear position (shift position) among a plurality of forward gear positions.

The dedicated reverse switch 33 is a switch that is operated by the driver to select the reverse gear position of the transmission 4. When the dedicated reverse switch 33 is operated when the vehicle 1 is in a stopped state, the control unit 10 controls the clutch actuator 11 and the shift actuator 13 to change the gear position of the transmission 4 to the reverse position.

To start the vehicle 1, the driver operates the shift switch 30U or 30D or the dedicated reverse switch 33 to select a gear position other than neutral. The control unit 10 thereby drives the shift actuator 13 to change the positioning of the transmission gears 43 of the transmission 4 to the selected gear position. The driver further operates the accelerator operator 20 to increase the accelerator opening degree. When the throttle opening degree increases accordingly, the engine speed increases. In accordance with the increase of engine speed, the control unit 10 controls the clutch actuator 11 to increase the clutch pressing amount and makes the driving side portion 31 and the driven side portion 32 approach each other.

The control unit 10 sets a target engine speed that is in accordance with the throttle opening degree and controls the clutch pressing amount so that the engine speed increases toward the target engine speed. The mutual pressing force of the driving side portion 31 and the driven side portion 32 thereby increases gradually and the clutch 3 enters the engaged state via the half-clutch state from the disengaged state.

The torque generated by the engine 2 is thus transmitted to the transmission 4 via the clutch 3. The rotation shifted by the transmission 4 is further transmitted to the vehicle wheel 5 and thereby the vehicle 1 moves. After the clutch 3 has entered the engaged state, the control unit 10 executes control (fuel injection control) of the fuel injection valve 22 and control (ignition control) of the ignition unit 23 so that an engine output that is in accordance with the throttle opening degree is obtained.

When during travel, the driver operates the shift-up switch 30U or the shift-down switch 30D, a shift command is input into the control unit 10. In response thereto, the control unit 10 executes the shift operation. Specifically, the control unit 10 controls the clutch actuator 11 to disengage the clutch 3. Further, the control unit 10 controls the shift actuator 13 to change the positioning of the transmission gears 43 to the selected gear position corresponding to the shift command. Thereafter, the control unit 10 controls the clutch actuator 11 to put the clutch 3 in the engaged state via the half-clutch state. When the clutch 3 enters the engaged state and the shift operation is completed, the control unit 10 executes the fuel injection control and the ignition control so that the engine output corresponding to the throttle opening degree is obtained.

If when the clutch 3 is in the engaged state, the vehicle speed falls below a shift-down threshold that is set in advance for each gear position, the control unit 10 executes an automatic shift-down control. More specifically, if the vehicle speed falls below a clutch disengage threshold determined for each shift stage, the control unit 10 controls the clutch actuator 11 to put the clutch 3 in the disengaged state. If the vehicle speed then falls below the shift-down threshold, the control unit 10 controls the shift actuator 13 to change the gear position so as to lower the shift stage by one stage. If the vehicle speed further falls below the shift-down threshold corresponding to the shift stage after the downward shift, the control unit 10 changes the gear position to lower the shift stage further by one stage. Thereafter, the control unit 10 controls the clutch actuator 11 to put the clutch 3 in the engaged state via the half-clutch state. When the clutch 3 enters the engaged state and the shift operation is completed, the control unit 10 executes the fuel injection control and the ignition control so that the engine output corresponding to the throttle opening degree is obtained.

If when the shift stage is at the lowest stage, the vehicle speed falls below the clutch disengage threshold corresponding to the lowest stage, the control unit 10 disengages the clutch 3. More specifically, if, in a state where a forward gear position of the lowest stage among the plurality of forward gear positions is selected, the vehicle speed falls below the clutch disengage threshold, the clutch 3 is disengaged. The same applies to reverse gear positions. If there is just one reverse gear position, the clutch 3 is disengaged when the vehicle speed falls below the clutch disengage threshold corresponding to the reverse gear position.

If at this point, the vehicle 1 is on an upward slope or a downward slope, the vehicle 1 coasts due to gravity unless a brake is applied. Using this, downward movement (forward movement) on a downward slope or downward movement (reverse movement) on an upward slope can be performed by coasting. During the coasting, the following control is executed.

If full accelerator closure (full throttle closure) is detected by the throttle opening degree sensor 26 and the vehicle speed sensor 16 detects the vehicle speed to be less than a predetermined vehicle speed threshold, the control unit 10 controls the clutch actuator 11 to maintain the clutch 3 in the disengaged state. When the vehicle 1 coasts, the vehicle speed sensor 16 detects an increase in vehicle speed. When the detected vehicle speed exceeds a predetermined half-clutch control starting threshold, the control unit 10 controls the clutch actuator 11 to control the clutch 3 to a state where torque is transmitted between the driving side portion 31 and the driven side portion 32. More accurately, the control unit 10 starts half-clutch control if at least one of either of the following two conditions is met when the clutch 3 is in the disengaged state.

Condition 1: The driven side rotational speed is higher than the driving side rotational speed.

Condition 2: The driven side rotational speed is not less than a predetermined value.

The driven side rotational speed is the rotational speed of the driven side portion 32 of the clutch 3, that is, the rotational speed of the main shaft 41 and corresponds to the vehicle speed. The rotational speed of the main shaft 41 is proportional to the rotational speed of the drive shaft 42, and a proportionality constant thereof is the shift ratio at the selected gear position. In the present preferred embodiment, the vehicle speed sensor 16 detects the rotational speed of the drive shaft 42. The driven side rotational speed can thus be calculated based on the shift ratio of the selected gear position (shift stage) and the vehicle speed.

The driving side rotational speed is the rotational speed of the driving side portion 31 of the clutch 3 and corresponds to the engine speed. For example, if a reduction gear is disposed between the crankshaft 24 and the driving side portion 31, the driving side rotational speed can be calculated based on the engine speed and the gear ratio of the reduction gear.

The driven side rotational speed and the driving side rotational speed do not necessarily have to be calculated. For example, if the vehicle speed exceeds the half-clutch control starting threshold (for example of approximately 15 km/h) that is in accordance with the selected gear position, Condition 2 is met. That is, in the judgment of Condition 2, the vehicle speed may be used as an alternative index to the driven side rotational speed. Also, for example, the engine speed may be converted to a rotational speed on the drive shaft 42 based on the shift ratio at the selected gear position, etc., to determine a vehicle speed converted value and the vehicle speed converted value may be determined as a driven side rotational speed equivalent value. Whether or not Condition 1 is met may be judged by comparing the vehicle speed converted value and the vehicle speed detected by the vehicle speed sensor 16. More specifically, when the clutch 3 is in the disengaged state and the engine speed is not more than an idling engine speed, Conditions 1 and 2 may be satisfied by the vehicle speed exceeding the half-clutch control starting threshold.

In half-clutch control, the control unit 10 sets a target engine speed, differing from that of the ordinary case, with respect to full accelerator closure. During full accelerator closure, the control unit 10 controls the clutch actuator 11 (controls the clutch pressing amount) to control the pressing force between the driving side portion 31 and the driven side portion 32 to attain the target engine speed.

Figure 2:
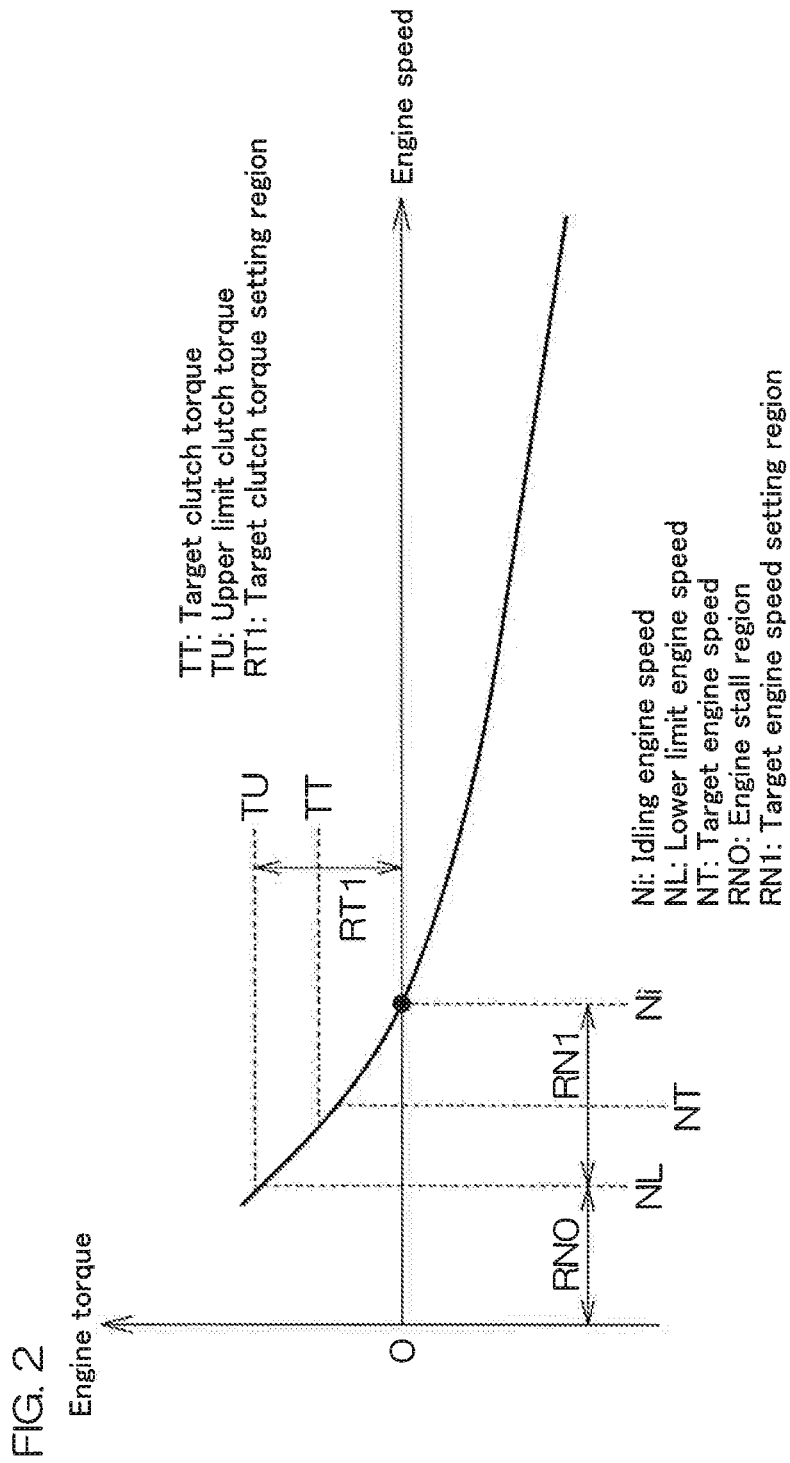
FIG. 2 is a diagram for describing a setting example of a target engine speed and a target clutch torque for full accelerator closure in half-clutch control during coasting of the vehicle.

FIG. 2 is a diagram for describing a setting example of the target engine speed during full accelerator closure in the half-clutch control during coasting and shows characteristics of the engine 2 when the clutch 3 is in the engaged state with full accelerator closure. The abscissa expresses the engine speed and the ordinate expresses the engine torque converted to the clutch shaft, that is, the torque (clutch torque) that the clutch 3 transmits from the driving side portion 31 to the driven side portion 32.

When the driving side portion 31 is generating a torque that promotes rotation of the driven side portion 32, that is, in a power running state, the engine torque takes on a positive value. When the driving side portion 31 is generating a torque that suppresses rotation of the driven side portion 32, that is, in a braking state, the engine torque takes on a negative value.

At the idling engine speed Ni, the engine torque is zero. When the engine speed exceeds the idling engine speed Ni, the engine torque has a negative value. This is because the engine 2 tends to maintain the idling engine speed Ni and generates an engine torque that suppresses rotation. When the engine speed is less than the idling engine speed Ni, the engine torque has a positive value. This is because the engine 2 tends to maintain the idling engine speed Ni and generates an engine torque that promotes rotation.

When the engine speed is in an engine stall region RN0 of not more than a lower limit engine speed NL, the engine 2 cannot be kept running and the engine 2 stops. The lower limit engine speed is a lower limit value of the engine speed at which engine stall does not occur.

A case where the vehicle 1 is on a downward slope in a state of full accelerator closure with the clutch 3 being in the engaged state shall now be considered. In this case, when the vehicle speed increases due to gravity applied to the vehicle 1, the vehicle 1 is braked by the negative engine torque resulting from the engine 2 tending to maintain the idling engine speed (engine braking). Also, a case where, when in the state of full accelerator closure with the clutch 3 being in the engaged state, the vehicle speed decreases because of an upward slope or road surface friction and consequently the engine speed becomes less than the idling engine speed shall be considered. In this case, the vehicle 1 is accelerated by a positive engine torque resulting from the engine 2 tending to maintain the idling engine speed.

The target engine speed NT for full accelerator closure in the half-clutch control is set to a value lower than the idling engine speed Ni and higher than the lower limit engine speed NL. That is, the target engine speed NT for full accelerator closure is set to a value within a target engine speed setting region RN1 having the idling engine speed Ni as an upper limit and the lower limit engine speed NL as the lower limit.

The control unit 10 sets the idling engine speed Ni variably in accordance with intake air temperature, oil temperature, whether or not starting has just been performed, cooling water temperature (engine temperature), etc. Accordingly, the control unit 10 sets the target engine speed NT for full accelerator closure variably according to the idling engine speed Ni when the half-clutch control is started.

In the half-clutch control, the control unit 10 controls the clutch actuator 11 so that the target engine speed NT is attained and thereby controls the pressing force between the driving side portion 31 and the driven side portion 32 of the clutch 3. The clutch torque transmitted between the driving side portion 31 and the driven side portion 32 is thereby varied to control the engine speed to the target engine speed NT.

Figure 3:
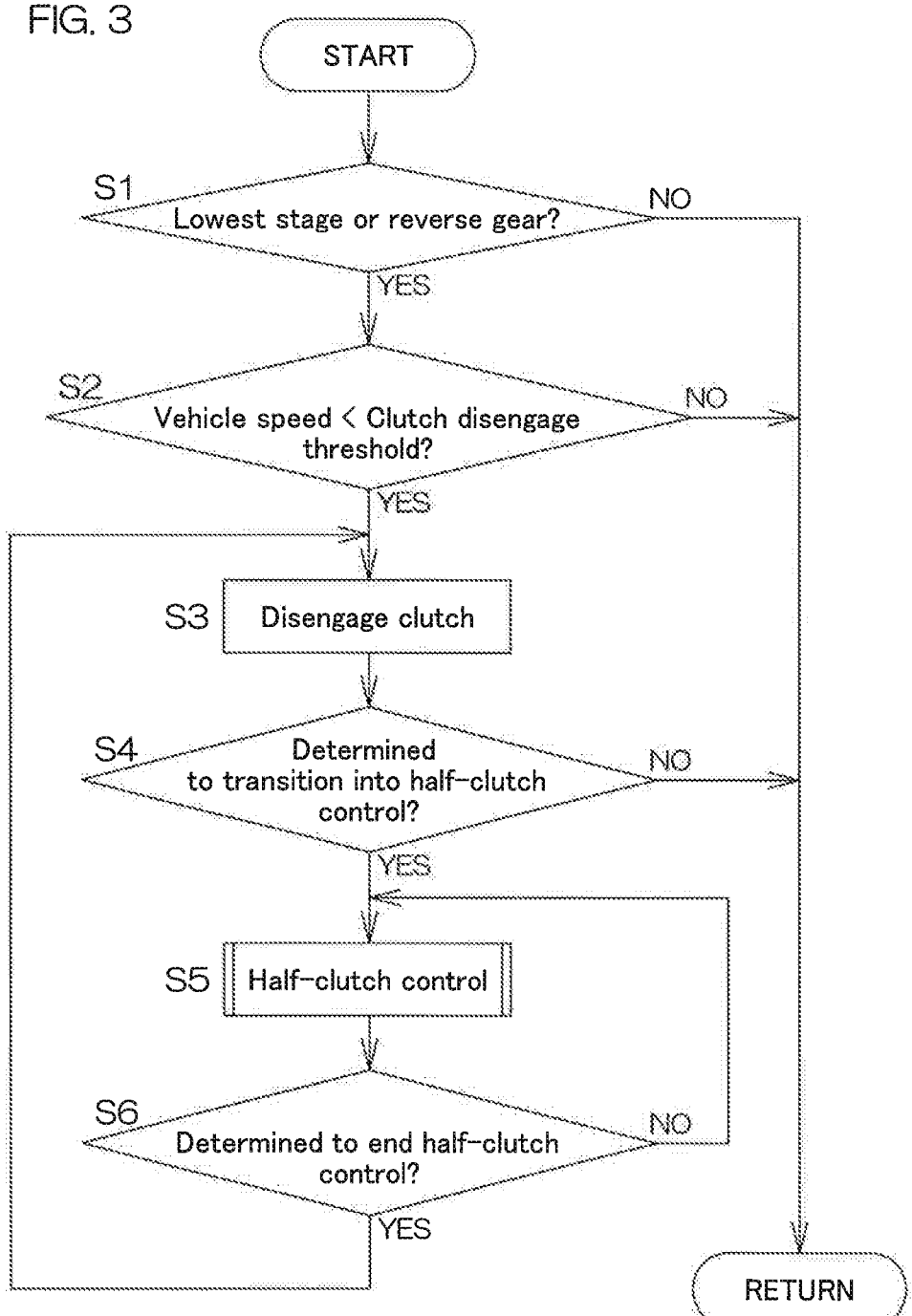
FIG. 3 is a flowchart for describing operations of a control unit included in the vehicle and mainly shows control operations during coasting.

FIG. 3 is a flowchart for describing operations of the control unit 10 and mainly shows control operations during coasting. The control unit repeats the operations at a predetermined control cycle (for example, of 10 msec).

The control unit 10 acquires information on the selected gear position (the gear position being selected) from the gear position sensor 15. The control unit 10 judges whether or not the selected gear position is the gear position of the lowest stage (lowest stage gear position) among the forward gear positions or the reverse gear position (if there are a plurality of reverse gear positions, the reverse gear position of the lowest stage) (step S1). If a positive (YES) judgment is made here, the control unit 10 judges whether or not the vehicle speed detected by the vehicle speed sensor 16 is less than the clutch disengage threshold (for example, of approximately 10 km/h) (step S2). If a negative (NO) judgment is made here, the process of step S3 onward is skipped to perform a further process. When the vehicle speed becomes less than the clutch disengage threshold (step S2: YES), the control unit 10 controls the clutch actuator 11 to control the clutch 3 to be in the disengaged state (step S3). The process corresponds to a function of the control unit 10 as a disengagement control unit.

When the clutch 3 enters the disengaged state, the control unit 10 judges whether or not to transition into the half-clutch control (step S4). The judgment is a function of the control unit 10 as a half-clutch transition control unit. If it is judged that the transition to the half-clutch control should be performed (step S4: YES), the control unit 10 starts the half-clutch control (step S5). If it is judged that the transition to the half-clutch control should not be performed (step S4: NO), the control unit 10 transitions to a further process without performing the half-clutch control.

During the half-clutch control (step S5), the control unit 10 judges whether or not a half-clutch control ending condition is met (step S6). If the half-clutch control ending condition is met (step S6: YES), the control unit 10 returns to step S3, puts the clutch 3 in the disengaged state, and ends the half-clutch control. If the half-clutch control ending condition is not met (step S6: NO), the control unit 10 continues with the half-clutch control (step S5).

Figure 4A:
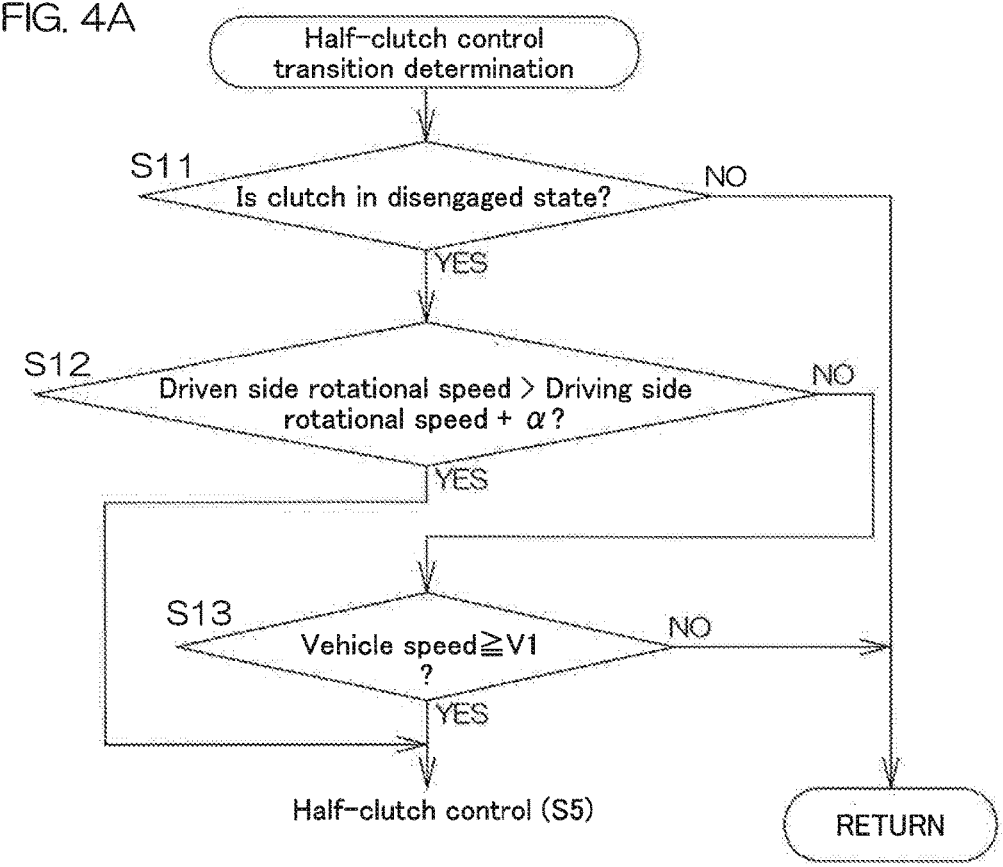
FIG. 4A is a flowchart for describing a specific example of a half-clutch control transition determination (step S4 in FIG. 3).

FIG. 4A is a flowchart for describing a specific example of the half-clutch control transition determination (step S4 in FIG. 3). The control unit 10 judges whether or not the clutch 3 is in the disengaged state (step S11). Also, the control unit 10 judges whether or not the driven side rotational speed is higher than the driving side rotational speed (step S12). In the present preferred embodiment, the control unit 10 judges whether or not the driven side rotational speed is greater than a value with which a predetermined value $\alpha$ ($\alpha \geq 0$) is added to the driving side rotational speed. In other words, the control unit 10 judges whether or not a difference between the driven side rotational speed and the driving side rotational speed is greater than a predetermined value $\alpha$. Further, the control unit 10 judges whether or not the driven side rotational speed is not less than a predetermined value (step S13). In the present preferred embodiment, the control unit 10 judges whether or not the vehicle speed is not less than a first predetermined value V1 (V1>0; V1 is, for example, approximately 15 km/h). These judgments may be made in any order. If a negative judgment is made in step S11, the control unit 10 does not transition into the half-clutch control. Also, if negative judgments are made in both step S12 and step S13 (half-clutch control transition conditions), the control unit 10 does not transition into the half-clutch control.

If a positive judgment is made in step S11 and a positive judgment is made in at least one of either of steps S12 and S13, the control unit 10 transitions into the half-clutch control (step S5 in FIG. 3). These processes (steps S11 to S13) correspond to functions of the control unit 10 as the half-clutch transition control unit.

In the example of FIG. 4A, transition to the half-clutch control is performed under the condition that a positive judgment is made in step S12 or step S13. However, transition to the half-clutch control may instead be performed under the condition that positive judgments are made in both of step S12 and step S13.

Also, one of either of the judgments among step S12 and step S13 may be omitted. Further if the half-clutch control transition judgment (step S4, FIG. 4A) is to be performed after disengaging the clutch 3 (step S3 of FIG. 3), the judgment of whether or not the clutch 3 is in the disengaged state (step S11) may be omitted.

Figure 4B:
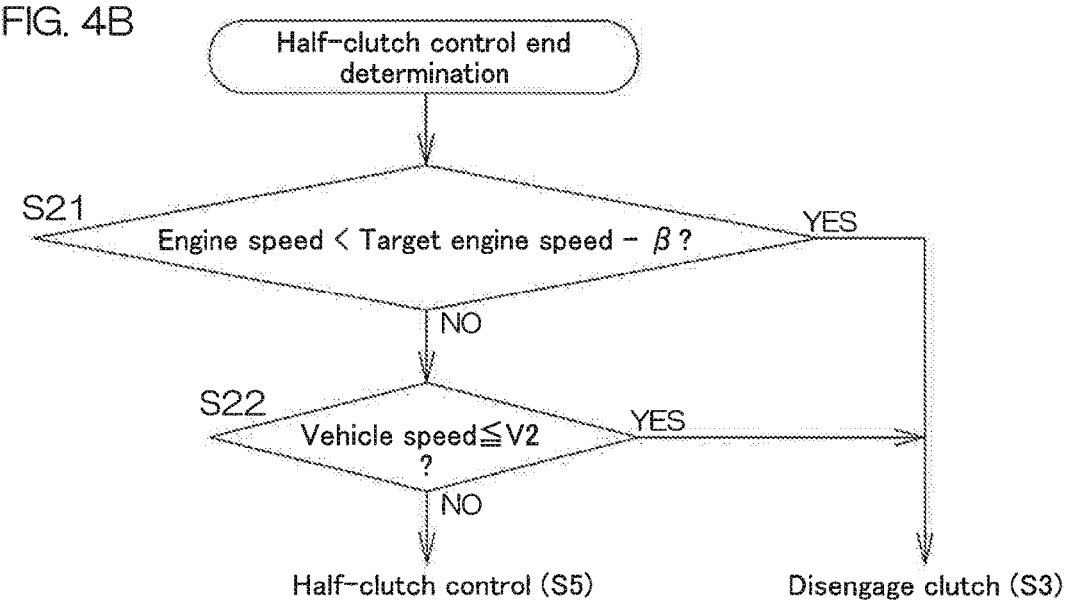
FIG. 4B is a flowchart for describing a specific example of a half-clutch control end determination (step S6 in FIG. 3).

FIG. 4B is a flowchart for describing a specific example of the half-clutch control end determination (step S6 in FIG. 3). The control unit 10 judges whether or not the driving side rotational speed is lower than the full accelerator closure target engine speed during the half-clutch control (step S21). In the present preferred embodiment, the same judgment is made using the engine speed in place of the driving side rotational speed. This is because the engine speed and the driving side rotational speed are in a proportional relationship. Specifically, the control unit 10 judges whether or not the engine speed is less than a value obtained by subtracting a predetermined value β (β≥0) from the target engine speed. Further, the control unit 10 judges whether or not the driven side rotational speed is not more than a predetermined value (step S22). In the present preferred embodiment, the control unit 10 judges whether or not the vehicle speed is not more than a second predetermined value V2 (V2>0; for example, V2<V1; V2 is, for example, approximately 10 km/h). These judgments may be made in any order. If a positive judgement is made in either of steps S21 and S22 (half-clutch control ending conditions), the control unit 10 ends the half-clutch control and disengages the clutch (step S3 of FIG. 3). Also, if negative judgments are made in all of the above (steps S21 and S22), the control unit 10 continues with the half-clutch control (step S5 of FIG. 3).

If the clutch 3 enters the engaged state while the half-clutch control (step S5 of FIG. 3) is being executed, the control unit 10 ends the half-clutch control.

FIG. 5 is a flowchart for describing a specific example of the half-clutch control. The control unit 10 acquires the idling engine speed at the point of transition into the half-clutch control (step S31). Based on the idling engine speed, the control unit 10 sets the full accelerator closure target engine speed to be used during the half-clutch control (step S32). This is a function of the control unit 10 as a target rotational speed setting unit. The target engine speed for full accelerator closure is set as has been described above with reference to FIG. 2.

The control unit 10 further calculates a changing amount of the clutch pressing amount based on the target engine speed and the actual engine speed that is calculated based on the output of the crank sensor 28 (step S33). The control unit 10 then renews a clutch command value based on the calculated clutch pressing amount changing amount (step S34). The clutch command value is an actuation command value for the clutch actuator 11. The control unit 10 adds the clutch pressing amount changing amount to the clutch command value (previous value) of the previous control cycle to determine the clutch command value (current value) of the current control cycle. The processes of steps S33 and S34 correspond to functions of the control unit 10 as a half-clutch control unit.

When the clutch pressing amount changing amount is a positive value, the clutch pressing amount is increased. Accordingly, the control unit 10 controls the clutch actuator 11 so that the driving side portion 31 and the driven side portion 32 of the clutch 3 approach each other, that is, so that at least one of these portions is displaced in the engaging direction. When the clutch pressing amount changing amount is a negative value, the clutch pressing amount is decreased. Accordingly, the control unit 10 controls the clutch actuator 11 so that the driving side portion 31 and the driven side portion 32 of the clutch 3 separate from each other, that is, so that at least one of these portions is displaced in the disengaging direction.

Figure 6:
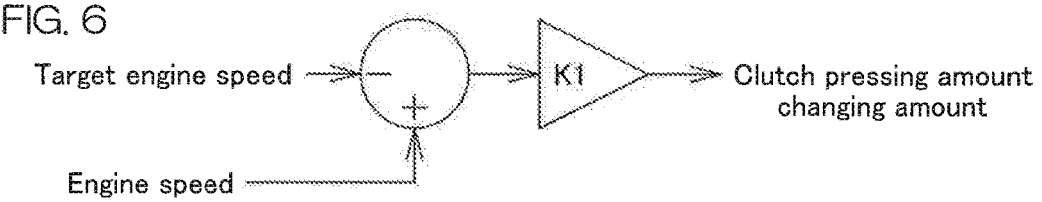
FIG. 6 is a block diagram for describing a calculation example of a clutch pressing amount changing amount.

FIG. 6 is a block diagram for describing a calculation example of the clutch pressing amount changing amount. In this example, the control unit 10 determines a deviation of the actual engine speed with respect to the full accelerator closure target engine speed (actual engine speed−target engine speed) and multiplies the deviation by a factor K1 (K1>0) to determine the clutch pressing amount changing amount. That is, the clutch pressing amount changing amount is determined by so-called P control (proportional control). Obviously, the clutch pressing amount changing amount may be determined by another calculation method using the difference of the target engine speed and the actual engine speed, such as that of PI control (proportional-integral control) or PID control (proportional-integral-derivative) control, etc.

By thus performing feedback control using the difference of the target engine speed and the actual engine speed, the clutch pressing amount is increased and decreased so that the actual engine speed is adjusted to the target engine speed.

The clutch pressing amount changing amount may be restricted to a predetermined upper value (>0) to avoid sudden change of the clutch pressing amount. Instantaneous engagement of the clutch 3 can thereby be avoided to enable gradual (stepwise) engagement of the driving side portion 31 and the driven side portion 32.

Figure 7:
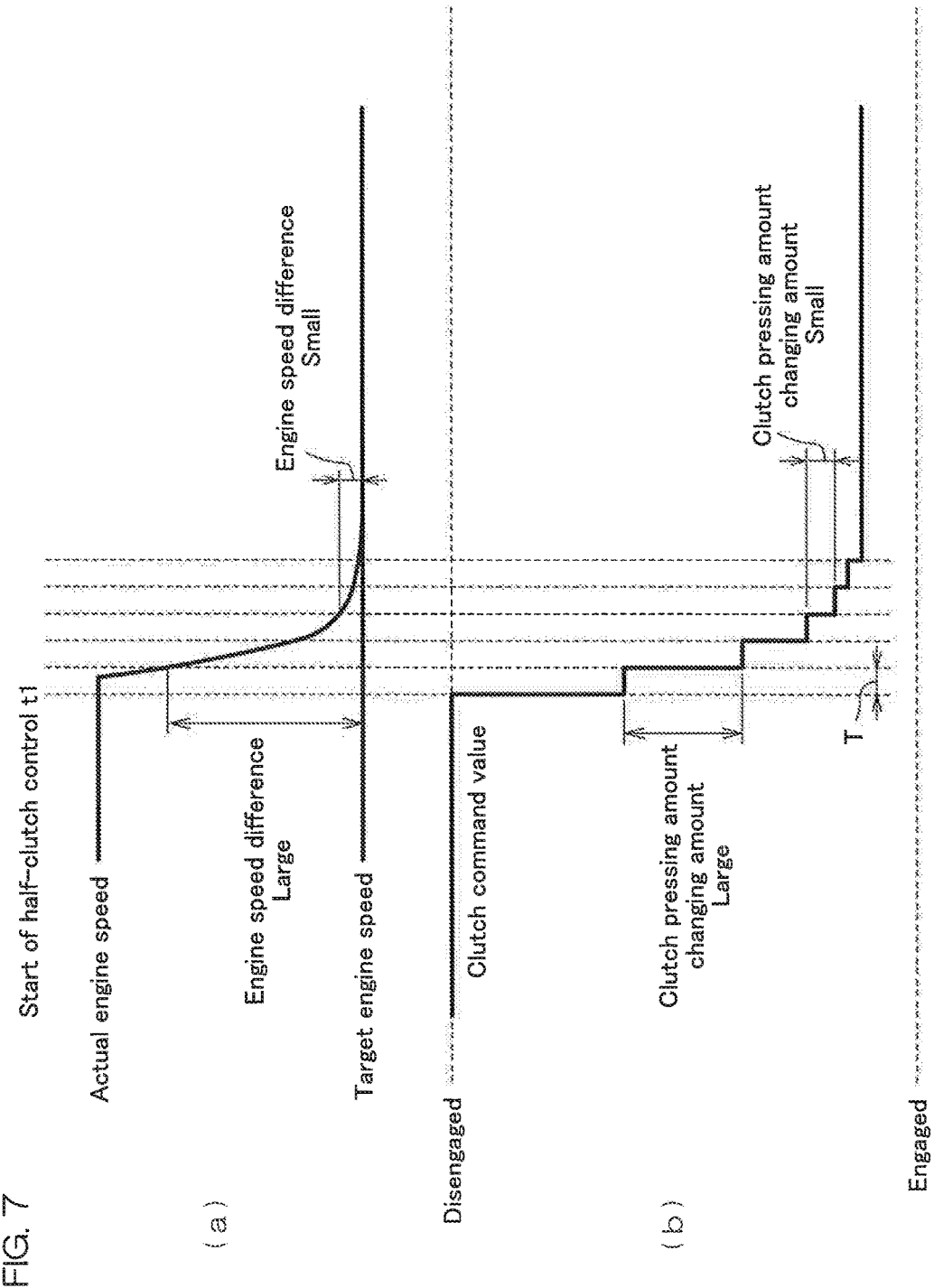
FIG. 7 shows diagrams for describing the calculation example of the clutch pressing amount changing amount.

FIG. 7 shows diagrams for describing the calculation example of the clutch pressing amount changing amount. FIG. 7 (a) shows changes of the actual engine speed, and FIG. 7 (b) shows changes of the clutch command value. The clutch command value corresponds to the distance (clutch pressing amount) between the driving side portion 31 and the driven side portion 32. The clutch command value may take on a value between a value corresponding to the disengaged state and a value corresponding to the engaged state.

Upon starting of the half-clutch control at a time t1, the difference of the actual engine speed with respect to the target engine speed is determined at each control cycle T. Immediately after the start of the half-clutch control, the difference of the target engine speed and the actual engine speed is large and the clutch pressing amount changing amount is thus large. The distance between the driving side portion 31 and the driven side portion 32 is thus reduced significantly. When the driving side portion 31 and the driven side portion 32 are thereby put in contact and the half-clutch state is entered, the driving side portion 31 and the driven side portion 32 are put in a state of being in frictional contact and the actual engine speed approaches the target engine speed. Therefore the difference between the two becomes small and the clutch pressing amount changing amount thus becomes small. The distance between the driving side portion 31 and the driven side portion 32, that is, the clutch pressing amount changing amount thus decreases gradually. When the difference of the target engine speed and the actual engine speed eventually becomes zero, the clutch pressing amount changing amount becomes zero and this state is maintained. The actual engine speed thus converges to the target engine speed, and the half-clutch state in which this state is maintained is sustained.

Figure 8:
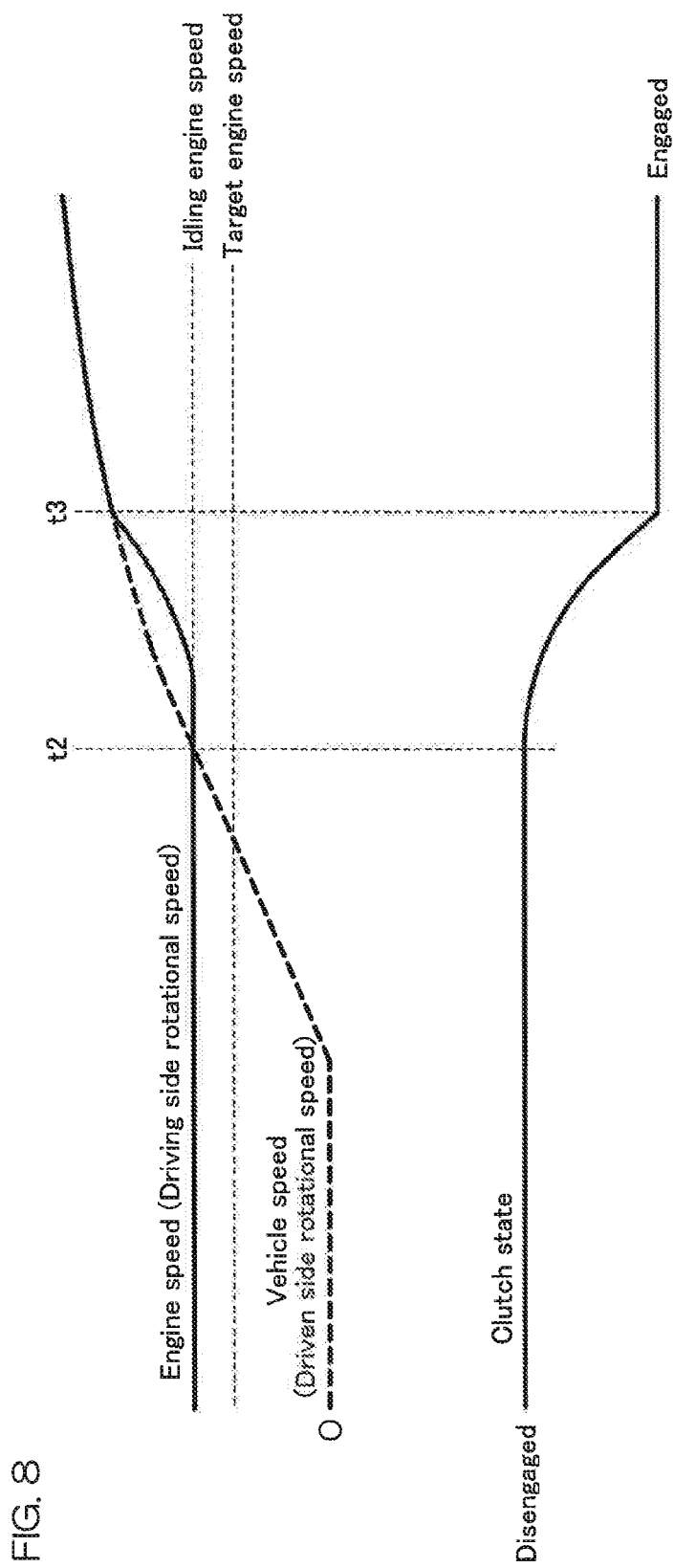
FIG. 8 shows an operation example of a case of moving downward (moving forward) by coasting on a downward slope in a state where a gear position of a transmission is set to a forward gear position.

FIG. 8 shows an operation example of a case of moving downward (moving forward) by coasting on a downward slope in a state where the gear position of the transmission 4 is a forward gear position.

When, with the clutch 3 being in the disengaged state, the vehicle 1 coasts due to gravity so that the vehicle speed increases and the driven side rotational speed exceeds the driving side rotational speed (or the vehicle speed becomes not less than the predetermined value V1), the half-clutch control is started (time t2).

The control unit 10 sets the full accelerator closure target engine speed to a value lower than the idling engine speed and calculates the clutch pressing amount changing amount in accordance with the difference of the target engine speed and the actual engine speed. The clutch pressing amount is increased and the clutch 3 enters the half-clutch state because the target engine speed is lower than the idling engine speed. Rotation of the driven side portion 32 is thus transmitted to the driving side portion 31, and therefore the actual engine speed increases, and the difference of the target engine speed and the actual engine speed increases further. The clutch 3 thus quickly enters the engaged state from the half-clutch state (time t3) and the driving side rotational speed and the driven side rotational speed become matched.

Due to the gravity acting on the vehicle 1, a state in which the actual engine speed is greater than the idling engine speed and thus greater than the target engine speed is maintained. Consequently, the clutch 3 is kept in the engaged state.

When the clutch 3 enters the engaged state, the clutch torque becomes negative because the actual engine speed is greater than the idling engine speed (see FIG. 2), and rotation of the driven side portion 32 becomes suppressed by the engine torque. Movement down the downward slope can thereby be performed while applying engine braking.

The operation is the same in a case of moving downward (moving in reverse) by coasting on an upward slope in a state where the gear position of the transmission 4 is a reverse gear position. This is because when the vehicle 1 moves in reverse in reverse gear, the driven side portion 32 of the clutch 3 rotates in the same direction as the driving side portion 31 that is rotated by the engine 2.

FIG. 9 shows an operation example of a case of moving downward (moving in reverse) by coasting on an upward slope in a state where the gear position of the transmission 4 is set to a forward gear position.

When, with the clutch 3 being in the disengaged state, the vehicle 1 coasts so that the vehicle speed increases and the driven side rotational speed exceeds the driving side rotational speed (or the vehicle speed becomes not less than the first predetermined value V1), the half-clutch control is started (time t4).

The control unit 10 sets the full accelerator closure target engine speed to a value lower than the idling engine speed and calculates the clutch pressing amount changing amount in accordance with the difference of the target engine speed and the actual engine speed. The clutch pressing amount changing amount is a positive value because the actual engine speed (idling engine speed) is higher than the target engine speed. The clutch pressing amount changing amount thus increases and the clutch 3 enters the half-clutch state from the disengaged state.

Due to the reverse movement in the forward gear position, the direction of the torque that the engine 2 applies to the driving side portion 31 of the clutch 3 is opposite the direction of the torque transmitted from the vehicle wheel 5 to the driven side portion 32. Therefore when the driving side portion 31 and the driven side portion 32 are put in contact, the actual engine speed decreases. The target engine speed is lower than the idling engine speed and therefore the actual engine speed approaches the target engine speed and the engine torque comes to take on a positive value (see FIG. 2). By the actual engine speed approaching the target engine speed, the clutch pressing amount changing amount decreases. Further, when the actual engine speed becomes lower than the target engine speed, the clutch pressing amount changing amount becomes a negative value and the clutch pressing amount decreases. The clutch pressing amount is thus increased and decreased so that the actual engine speed approaches the target engine speed and the half-clutch state that maintains this state is sustained.

By such an operation, the rotation of the driven side portion 32 is suppressed by the positive engine torque generated by the engine 2, and braking of the vehicle wheel 5 can be performed using the torque of the engine 2. On the other hand, the actual engine speed is maintained at a value close to the target engine speed and therefore engine stall will not occur. Downward movement (reverse movement) on a downward slope by coasting while staying in forward gear can thus be performed while avoiding engine stall and applying engine braking.

The operation is the same in a case of moving downward (moving forward) by coasting on a downward slope in a state where the gear position of the transmission 4 is a reverse gear position. This is because when the vehicle 1 moves forward in reverse gear, the driven side portion 32 of the clutch 3 rotates in the opposite direction as the driving side portion 31 that is rotated by the engine 2.

Figure 10A:
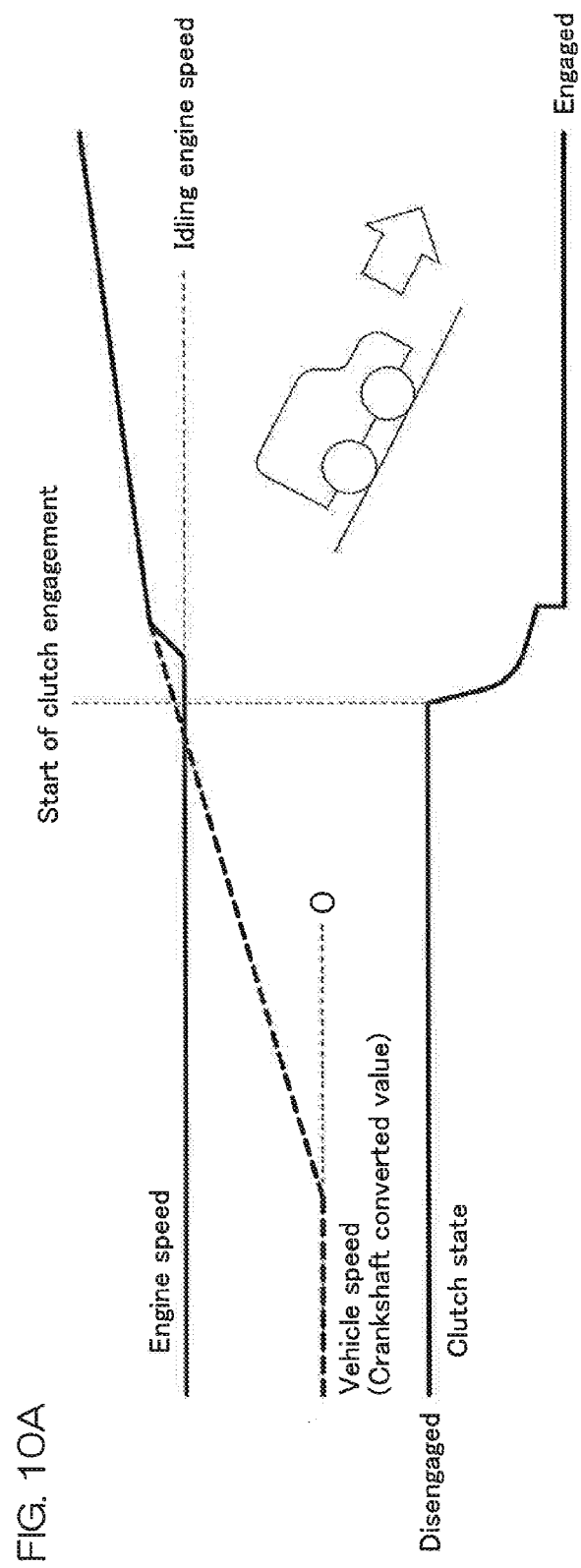

FIG. 10A and FIG. 10B are diagrams for describing operations by the arrangement of a comparative example. The comparative example that is assumed here is arranged so that if, in the state of full accelerator closure, the vehicle speed exceeds an idling engine speed equivalent value, a clutch engaging operation is started.

In a case of moving down a downward slope by moving forward in a forward gear position, control for engaging the clutch is started when a crankshaft rotation converted value of the vehicle speed reaches the engine speed as shown in FIG. 10A. The clutch is thereby put in the engaged state via the half-clutch state from the disengaged state. At this point, the engine is in a state of full accelerator closure and higher rotational speed than the idling engine speed, and therefore the engine torque that the clutch transmits to the vehicle wheel takes on a negative value (see FIG. 2) and the engine suppresses the rotation of the vehicle wheel. Movement down the downward slope can thus be performed using engine braking.

On the other hand, an operation in a case of giving up on climbing in the middle of attempting to climb an upward hill in a forward gear position and moving in reverse by coasting is shown in FIG. 10B. By fully closing the accelerator, the engine speed is decreased and accordingly the vehicle speed is decreased. When the engine speed reaches the idling engine speed, the clutch is disengaged. Thereafter, the vehicle speed becomes zero and the vehicle begins to move in reverse. Although in FIG. 10B, the vehicle speed takes on a negative value to express reverse movement, a vehicle speed sensor using a rotational pulse generating unit cannot generate information on the rotational direction. Therefore the vehicle speed information is just information on the magnitude as indicated by reference symbol 60. In this case, when the absolute value of the vehicle speed reaches the idling engine speed equivalent value, the operation for engaging the clutch is started and the engaged state is entered via the half-clutch state.

However, due to the vehicle moving in reverse in the forward gear position, the direction of the torque that the engine applies to the driving side portion of the clutch is opposite the direction of the torque input from the vehicle wheel to the driven side portion of the clutch. Therefore, when the clutch is put in the engaged state, the engine speed decreases rapidly from the idling engine speed and engine stall occurs. Reverse movement using engine braking thus cannot be performed. Moreover, the clutch is engaged automatically and therefore moving down the slope using gravity cannot be performed while avoiding engine stall.

With the preferred embodiment described above, such a problem does not occur and in moving in reverse by coasting on an upward slope while remaining in forward gear, engine stall does not occur and engine braking can be used.

As described above, with the present preferred embodiment, when one of either or both of Condition 1 that the driven side rotational speed is higher than the driving side rotational speed and Condition 2 that the vehicle speed (that is, the driven side rotational speed) is not less than the first predetermined value V1 is or are met due to coasting of the vehicle 1 when the clutch 3 is in the disengaged state, the half-clutch control is started. In the half-clutch control, the mutually pressing force of the driving side portion 31 and the driven side portion 32 is increased if the engine speed (equivalent to the driving side rotational speed) is higher than the full accelerator closure target engine speed. On the other hand, the pressing force is decreased if the engines speed is lower than the target engine speed. Control of the pressing force is achieved by control of the clutch actuator 11. Therefore by controlling the clutch actuator 11, the engine speed is adjusted to the target engine speed. The target engine speed corresponding to full accelerator closure is set to a value lower than the idling engine speed.

As has already been described in detail, movement down a slope using gravity can thus be performed while applying engine braking and without occurrence of engine stall regardless of whether or not the gear position of the transmission 4 and the moving direction of the vehicle 1 are matched.

Also with the present preferred embodiment, in the half-clutch control, the full accelerator closure target engine speed is set to a higher value than the lower limit engine speed at which the engine 2 can be kept running Therefore, even if the gear position and the travel direction of the vehicle 1 are not matched, movement down a slope can be performed using gravity while avoiding engine stall and applying engine braking.

Also with the present preferred embodiment, the idling engine speed is set variably in accordance with a parameter, such as the intake air temperature, oil temperature, whether or not starting has just been performed, cooling water temperature (engine temperature), etc., and accordingly, the target engine speed is set variably based on the idling engine speed at the time of start of the half-clutch control. Movement down a slope using gravity can thereby be performed while applying engine braking and reliably avoiding engine stall regardless of the gear position being a forward gear position or a reverse gear position.

Also with the present preferred embodiment, the pressing amount changing amount of the clutch 3 (pressing force changing amount in the half-clutch state) is set variably in accordance with the difference of the actual engine speed and the target engine speed (more specifically, the deviation of the actual engine speed with respect to the target engine speed). An appropriate pressing force can thereby be attained at the clutch 3, especially when moving down a slope in a state where the gear position and the travel direction of the vehicle 1 are not matched.

Also by the clutch pressing amount changing amount being set to be greater the greater the difference, an appropriate pressing force can be realized quickly. Movement down a slope using gravity can thus be performed in a state of generating an appropriate engine braking force while avoiding engine stall.

Further with the present preferred embodiment, the vehicle speed sensor 16 includes the rotational pulse generating unit 16a that generates, in accordance with the rotation of the drive shaft 42, rotational pulses that are not related to the rotational direction but are in accordance with the rotational amount. Therefore the vehicle speed information does not include information related to the travel direction of the vehicle 1, that is, the rotational direction of the vehicle wheel 5. Despite being such an arrangement that uses the inexpensive vehicle speed sensor 16 that does not output information related to direction, movement down a slope using gravity can be performed while applying engine braking and avoiding engine stall regardless of the gear position. This is because, as described above, the arrangement that controls the pressing force of the clutch 3 by comparing the engine speed and the target engine speed is capable of actuation independent of whether or not the gear position and the travel direction of the vehicle 1 are matched.

Also with the present preferred embodiment, the clutch 3 is disengaged when the vehicle speed, that is, the driven side rotational speed is at the clutch disengage threshold. That is, when the driven side rotational speed becomes not more than the predetermined value due to deceleration of the vehicle 1, the clutch 3 is disengaged. Excessive decrease of the engine speed can thereby be avoided and engine stall due to automatic disengagement of the clutch 3 can be avoided.

Also with the present preferred embodiment, the driven side rotational speed is equivalent to the vehicle speed of the vehicle 1. The half-clutch control can thus be performed in accordance with the vehicle speed. The vehicle speed may be used as the driven side rotational speed or another index corresponding to the vehicle speed may be used as the driven side rotational speed.

A second preferred embodiment of the present invention shall now be described. FIG. 1 and FIG. 2 shall be referenced again in the description of the second preferred embodiment.

With the first preferred embodiment, in the half-clutch control, the full accelerator closure target engine speed NT is set and the clutch actuator 11 is controlled so that the engine speed becomes equal to the target engine speed NT. On the other hand, with the second preferred embodiment, in the half-clutch control, a target clutch torque TT to be applied during full accelerator closure is set and the clutch actuator 11 is controlled so that the clutch torque in actuality (actual clutch torque) becomes equal to the target clutch torque TT.

Figure 11:
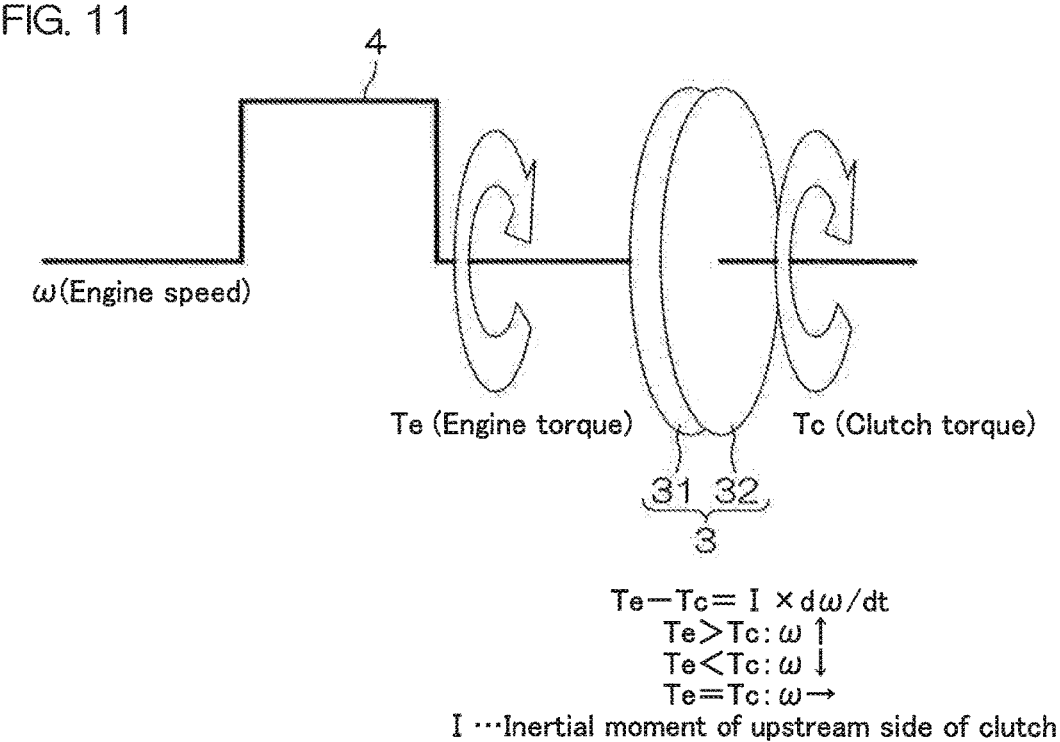
FIG. 11 is a diagram for describing a method for determining an actual clutch torque.

FIG. 11 is a diagram for describing a method for determining the actual clutch torque. The clutch torque is the torque that is transmitted from the driving side portion 31 to the driven side portion 32 of the clutch 3. When a torque of the rotational direction of the engine 2 is transmitted from the driving side portion 31 to the driven side portion 32, the clutch torque takes on a positive value. When a torque of a direction opposite the rotational direction of the engine 2 is transmitted from the driving side portion 31 to the driven side portion 32, that is, when engine braking is applied, the clutch torque takes on a negative value.

A relationship expressed by the formula below holds among an engine torque Te transmitted to the driving side portion 31, the clutch torque Tc, and the engine speed $\omega$. Here, I is an inertial moment of the entirety of a portion of the power transmission path 6 that includes the driving side portion 31 of the clutch 3 and portions further upstream (to the engine 2 side) thereof and t is time.

$$Te - Tc = I \times (d\omega/dt) \tag{1}$$

Therefore, if Te>Tc, the engine speed $\omega$ increases. If Te<Tc, the engine speed $\omega$ decreases. If Te=Tc, the engine speed $\omega$ does not change.

It can be understood that by modifying the above formula (1), the clutch torque Tc can be obtained by the following formula.

$$Tc = Te - I \times (d\omega/dt) \tag{2}$$

That is, the clutch torque Tc (actual clutch torque) can be determined based on the engine torque Te and temporal change dω/dt of the engine speed.

Figure 12:
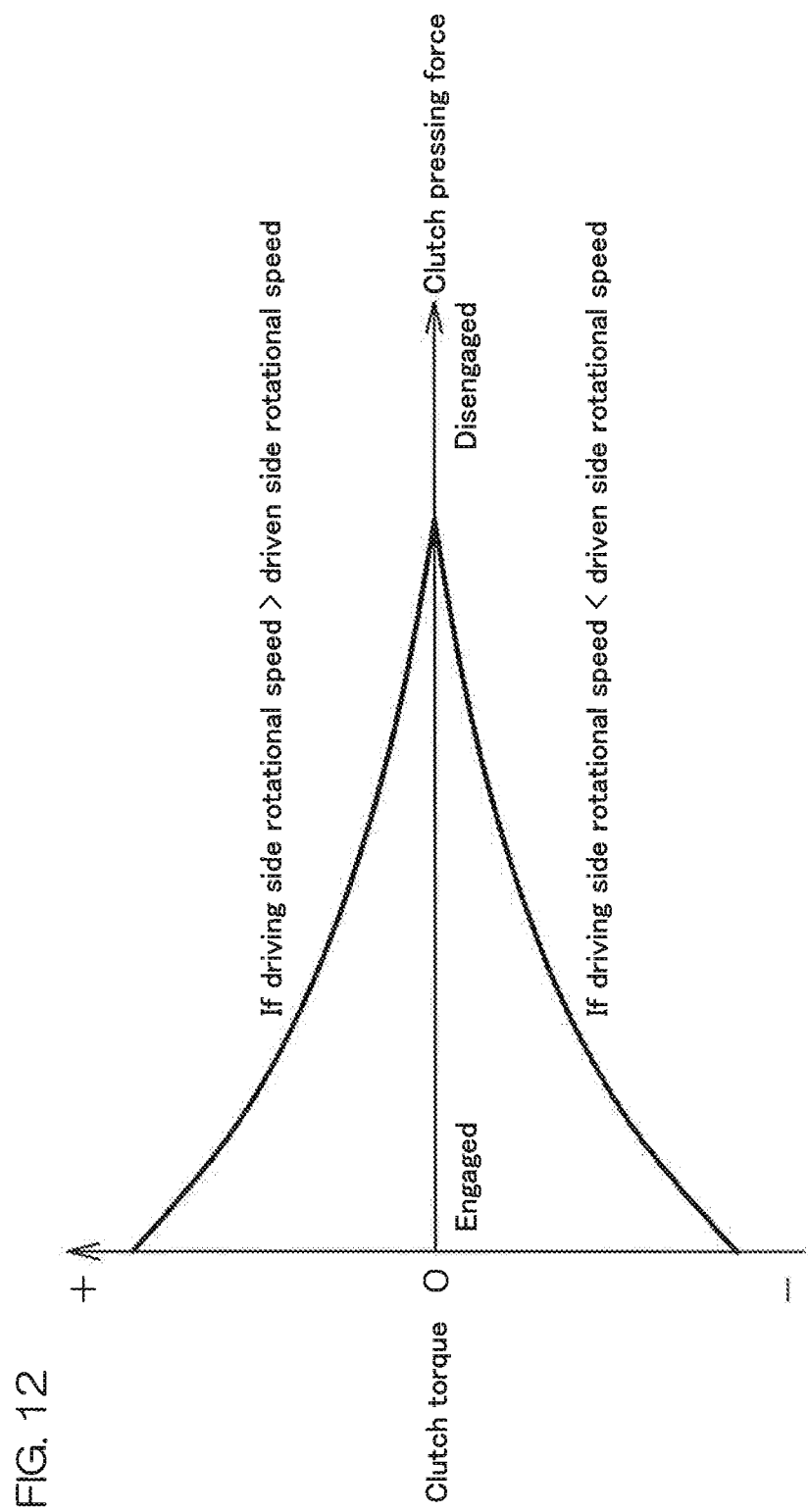
FIG. 12 shows a relationship of a clutch torque and a clutch pressing force in the half-clutch state.

FIG. 12 shows a relationship of the clutch torque and the clutch pressing force (pressing force of the driving side portion 31 and the driven side portion 32) in the half-clutch state. When the driving side rotational speed is greater than the driven side rotational speed, the clutch torque takes on a positive value. Oppositely, when the driving side rotational speed is less than the driven side rotational speed, the clutch torque takes on a negative value. The magnitude (absolute value) of the clutch torque decreases as the clutch pressing force decreases, that is, as the disengaged state is approached.

Setting of the target clutch torque shall now be described with reference again to FIG. 2.

The full accelerator closure target clutch torque TT in the half-clutch control is set to a value greater than a clutch torque (=0) at the idling engine speed Ni and lower than a clutch torque TU (upper limit clutch torque) at the lower limit engine speed NL. In other words, a value equivalent to an engine torque generated by the engine 2 at an engine speed higher than the lower limit engine speed NL and lower than the idling engine speed Ni is set as the target clutch torque TT corresponding to full accelerator closure. The target clutch torque TT for full accelerator closure is thus set within a target clutch torque setting region RT1 corresponding to the target engine speed setting region RN1 in the half-clutch control in the first preferred embodiment. The control unit 10 sets the idling engine speed Ni variably in accordance with the intake air temperature, oil temperature, whether or not starting has just been performed, cooling water temperature (engine temperature), etc. Accordingly, the control unit 10 sets the full accelerator closure target clutch torque TT variably according to the idling engine speed Ni when the half-clutch control is started.

In the half-clutch control, the control unit 10 controls the clutch actuator 11 so that the target clutch torque TT is attained and thereby controls the pressing force between the driving side portion 31 and the driven side portion 32 of the clutch 3. The clutch torque transmitted between the driving side portion 31 and the driven side portion 32 is thereby varied to control the actual clutch torque to the target clutch torque TT.

When the half-clutch control is to be ended, the control unit 10 preferably cancels the target clutch torque TT for full accelerator closure and returns to an ordinary operation of controlling the engine output in accordance with throttle opening degree.

Operations of the control unit 10 when the vehicle 1 coasts are the same as that in the case of FIG. 3 that was referenced above in the description of the first preferred embodiment. Operations related to the half-clutch control transition determination (step S4 in FIG. 3) and the half-clutch control end determination (step S6 in FIG. 3) are also the same and are as shown in FIG. 4A and FIG. 4B, respectively. FIG. 3, FIG. 4A, and FIG. 4B shall thus be referenced together in the following description.

Figure 13:
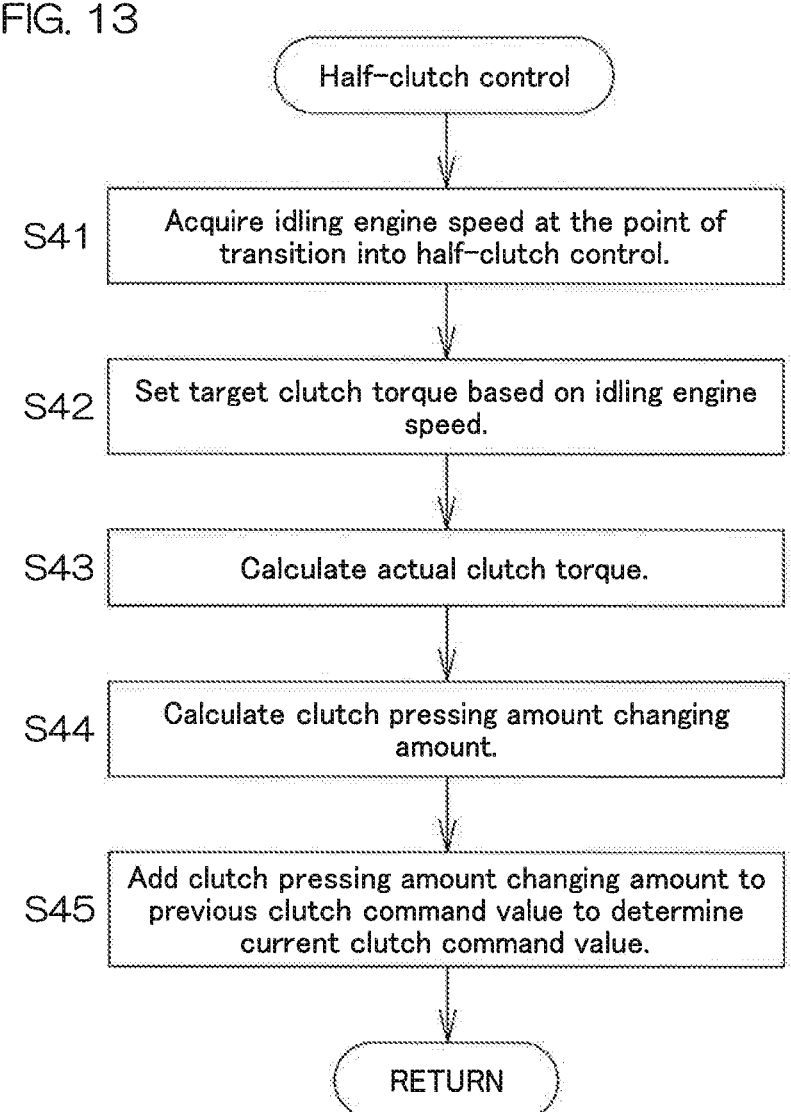
FIG. 13 is a flowchart for describing a specific example of half-clutch control.

With the present preferred embodiment, the contents of the half-clutch control (step S5 in FIG. 3) differ from those of the first preferred embodiment (see FIG. 5) and half-clutch control performed by the control unit 10 is as shown in FIG. 13.

FIG. 13 is a flowchart for describing a specific example of the half-clutch control. The control unit 10 acquires the idling engine speed at the point of transition into the half-clutch control (step S41). Based on the idling engine speed, the control unit 10 sets the target clutch torque for full accelerator closure (step S42). The target clutch torque is set as has been described above with reference to FIG. 2. The processes of steps S41 and S42 correspond to functions of the control unit 10 as a target clutch torque setting unit.

The control unit 10 further calculates the actual clutch torque (step S43). The calculation corresponds to a function of the control unit 10 as a clutch torque acquisition unit. The actual clutch torque is calculated as has been described above with reference to FIG. 11.

Further, the control unit 10 calculates a changing amount of the clutch pressing amount based on the target clutch torque and the actual clutch torque (step S44). The control unit 10 then renews the clutch command value based on the calculated clutch pressing amount changing amount (step S45). The control unit 10 adds the clutch pressing amount changing amount to the clutch command value (previous value) of the previous control cycle to determine the clutch command value (current value) of the current control cycle. The processes of steps S44 and S45 correspond to functions of the control unit 10 as a half-clutch control unit.

The clutch torque is proportional to the torque of the driving vehicle wheel 5. The clutch torque may be acquired by measuring torsion of the drive shaft 42 by a torque sensor. Or, the clutch torque may also be acquired by detecting a phase difference between respective end portions of the drive shaft 42.

Figure 14:
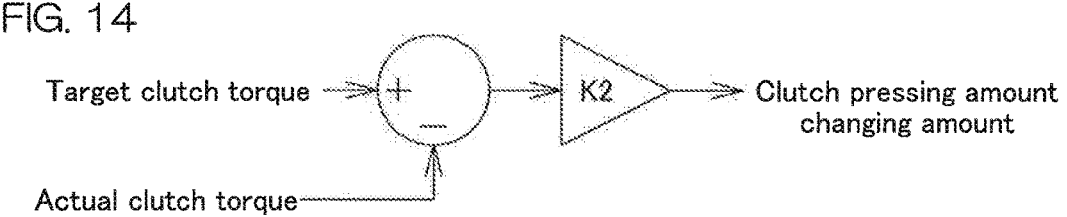
FIG. 14 is a block diagram for describing a calculation example of a clutch pressing amount changing amount.

FIG. 14 is a block diagram for describing a calculation example of the clutch pressing amount changing amount. In the present example, the control unit 10 determines a deviation of the target clutch torque with respect to the actual clutch torque (=target clutch torque−actual clutch torque) and multiplies the difference by a factor K2 (K2>0) to determine the clutch pressing amount changing amount. That is, the clutch pressing amount changing amount is determined by so-called P control (proportional control). Obviously, the clutch pressing amount changing amount may be determined by another calculation method using the difference of the actual clutch torque and the target clutch torque, such as that of PI control (proportional-integral control) or PID control (proportional-integral-derivative) control, etc.

By thus performing feedback control using the difference of the actual clutch torque and the target clutch torque, the clutch pressing amount is increased and decreased so that the actual clutch torque is adjusted to the target clutch torque.

Figure 15:
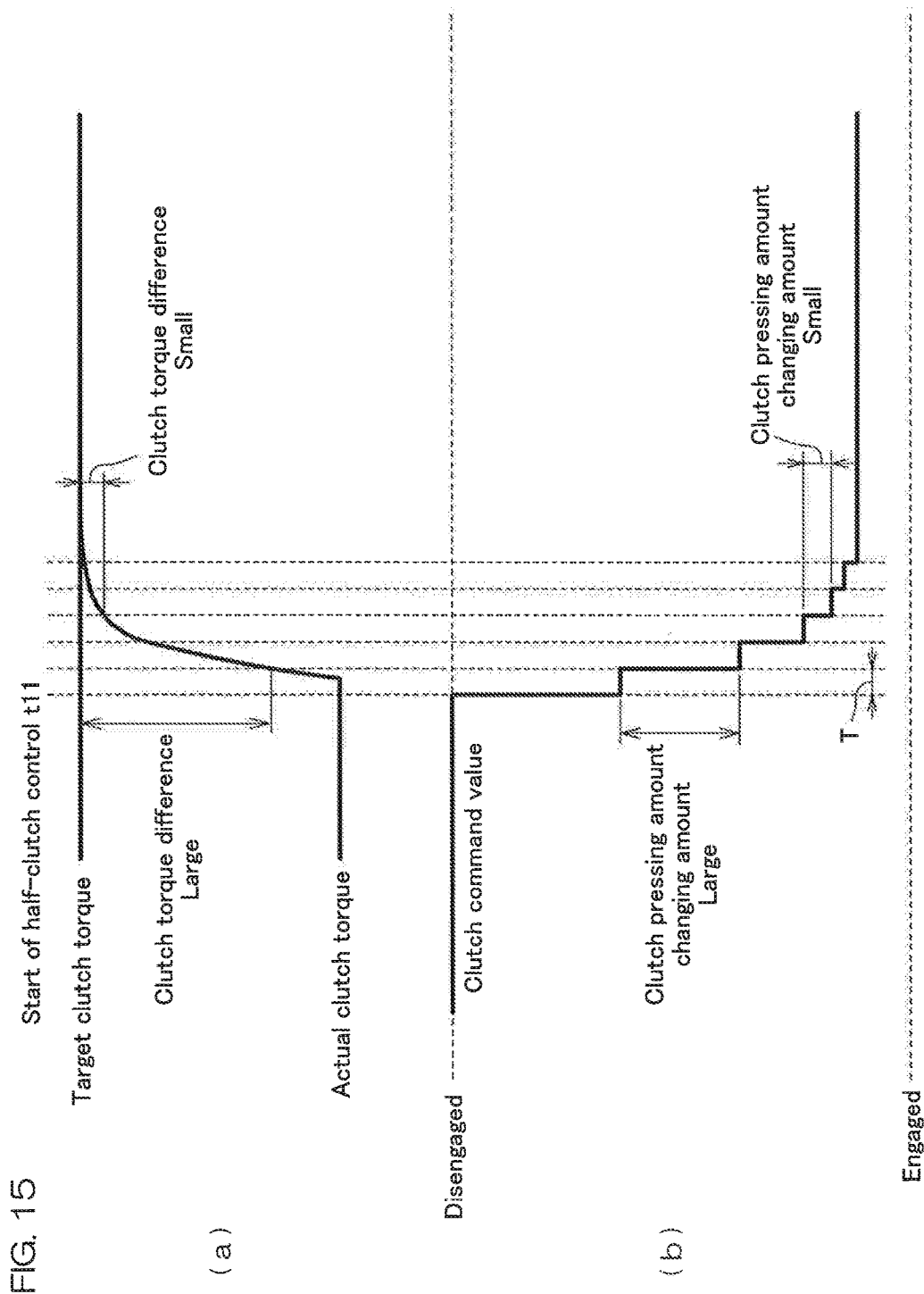
FIG. 15 is a diagram for describing the calculation example of the clutch pressing amount changing amount.

FIG. 15 shows diagrams for describing the calculation example of the clutch pressing amount changing amount. FIG. 15 (a) shows changes of the actual clutch torque, and FIG. 15 (b) shows changes of the clutch command value. The clutch command value corresponds to the distance between the driving side portion 31 and the driven side portion 32 as mentioned above. The clutch command value may take on a value between the value corresponding to the disengaged state and the value corresponding to the engaged state.

Upon starting of the half-clutch control at a time t11, the difference of the target clutch torque with respect to the actual clutch torque is determined at each control cycle T. Immediately after the start of the half-clutch control, the difference of the actual clutch torque and the target clutch torque is large and the clutch pressing amount changing amount is thus large. The distance between the driving side portion 31 and the driven side portion 32 is thus reduced significantly. When the driving side portion 31 and the driven side portion 32 are thereby put in contact and the half-clutch state is entered, the driving side portion 31 and the driven side portion 32 are put in a state of being in frictional contact and the actual clutch torque approaches the target clutch torque. Therefore the difference between the two becomes small and the clutch pressing amount changing amount thus becomes small. The distance between the driving side portion 31 and the driven side portion 32, that is, the clutch pressing amount changing amount thus decreases gradually. When the difference of the actual clutch torque and the target clutch torque eventually becomes zero, the clutch pressing amount changing amount becomes zero and this state is maintained. The actual clutch torque thus converges to the target clutch torque, and the half-clutch state in which this state is maintained is sustained.

Figure 16:
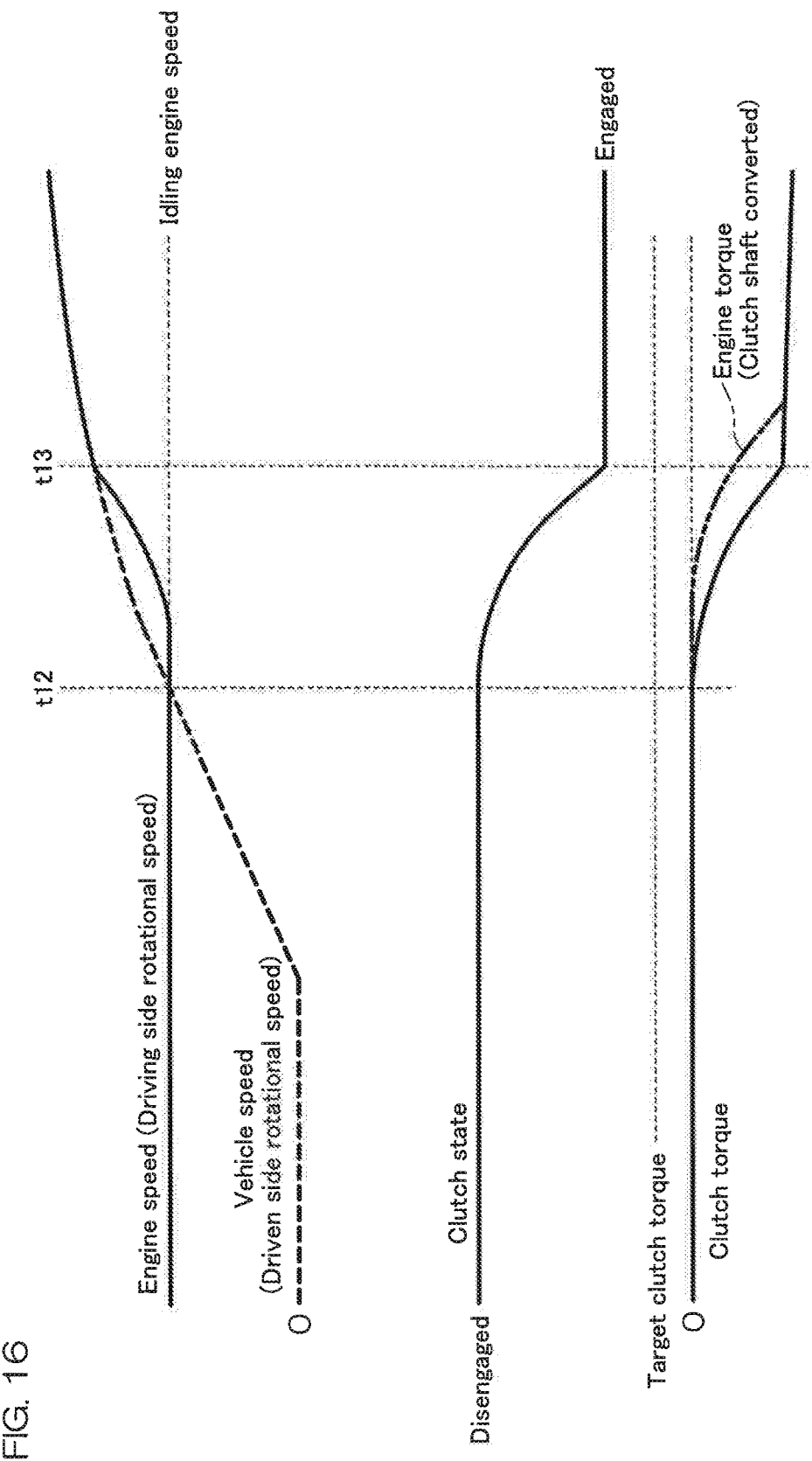
FIG. 16 shows an operation example of a case of moving downward (moving forward) by coasting on a downward slope in a state where the gear position of the transmission is set to the forward gear position.

FIG. 16 shows an operation example of a case of moving downward (moving forward) by coasting on a downward slope in a state where the gear position of the transmission 4 is a forward gear position.

When, with the clutch 3 being in the disengaged state, the vehicle 1 coasts due to gravity so that the vehicle speed increases and the driven side rotational speed exceeds the driving side rotational speed (or the vehicle speed becomes not less than the first predetermined value V1), the half-clutch control is started (time t12). The control unit 10 sets the full accelerator closure target clutch torque to a value greater than an engine torque equivalent value (=0) at the idling engine speed and calculates the clutch pressing amount changing amount in accordance with the difference of the target clutch torque and the actual clutch torque. The clutch pressing amount is increased and the clutch 3 enters the half-clutch state because the target clutch torque is greater than the actual clutch torque. The torque input from the vehicle wheel 5 is thus transmitted from the driven side portion 32 to the driving side portion 31 and therefore the actual clutch torque decreases (becomes a negative value) and the difference of the target clutch torque and the actual clutch torque increases further. The clutch 3 thus quickly enters the engaged state from the half-clutch state (time t13), and the driving side rotational speed and the driven side rotational speed become matched.

Due to the gravity acting on the vehicle 1, the actual engine speed is greater than the idling engine speed and therefore the actual clutch torque is kept in the negative state, that is, in a state where it is smaller than the target clutch torque. Consequently, the clutch 3 is kept in the engaged state.

When the clutch 3 enters the engaged state, the clutch torque becomes negative because the actual engine speed is greater than the idling engine speed (see FIG. 2), and the rotation of the driven side portion 32 becomes suppressed by the engine torque. Movement down the downward slope can thereby be performed while applying engine braking.

The operation is the same in a case of moving downward (moving in reverse) by coasting on an upward slope in a state where the gear position of the transmission 4 is a reverse gear position. This is because when the vehicle 1 moves in reverse in the reverse gear position, the driven side portion 32 of the clutch 3 rotates in the same direction as the driving side portion 31 that is rotated by the engine 2.

Figure 17:
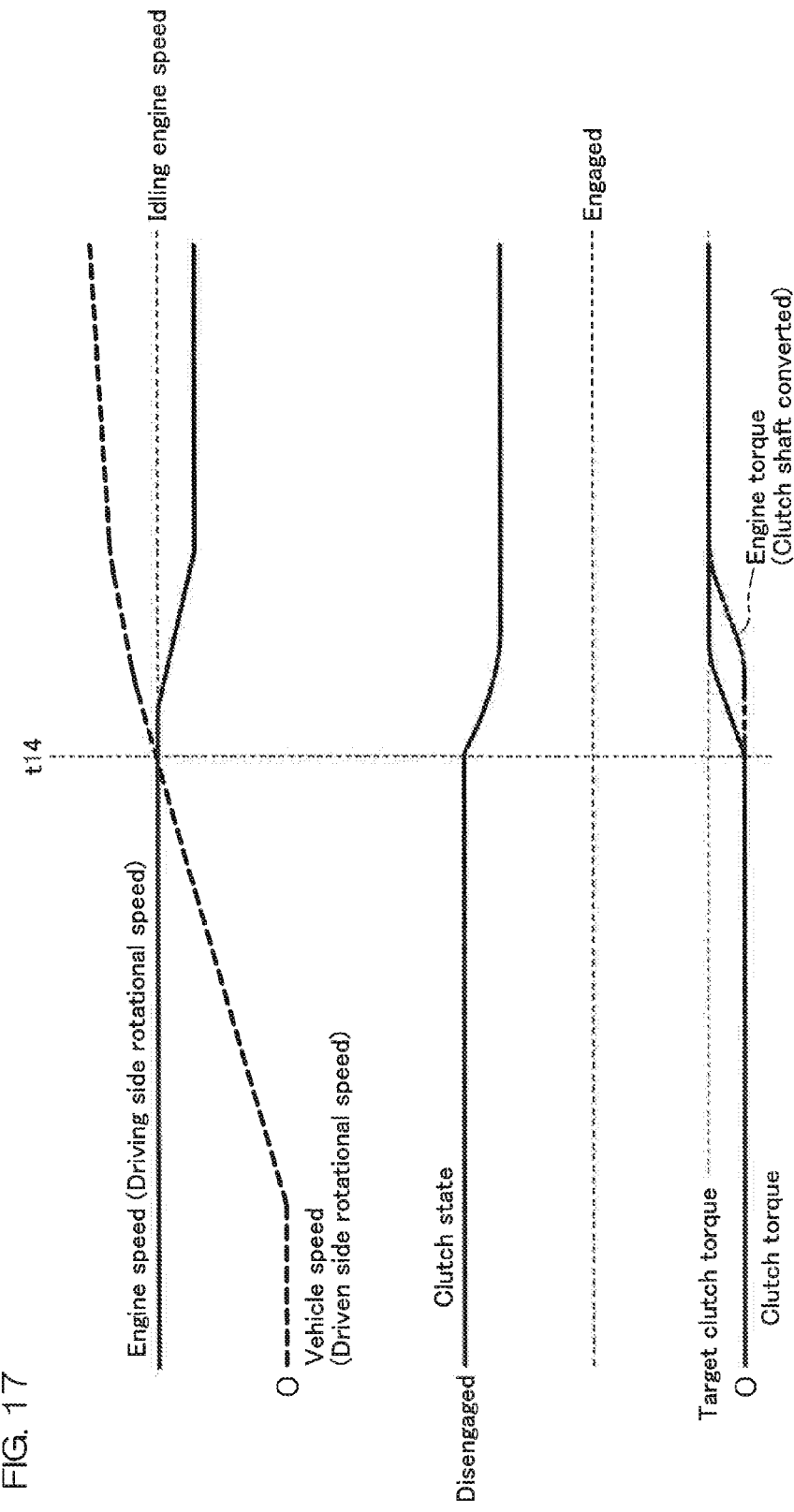
FIG. 17 shows an operation example of a case of moving downward (moving in reverse) by coasting on an upward slope in a state where the gear position of the transmission is set to the forward gear position.

FIG. 17 shows an operation example of a case of moving downward (moving in reverse) by coasting on an upward slope in a state where the gear position of the transmission 4 is set to a forward gear position.

When, with the clutch 3 being in the disengaged state, the vehicle 1 coasts so that the vehicle speed increases and the driven side rotational speed exceeds the driving side rotational speed (or the vehicle speed becomes not less than the first predetermined value V1), the half-clutch control is started (time t14). The control unit 10 sets the full accelerator closure target clutch torque to a value greater than the engine torque equivalent value (=0) at the idling engine speed and calculates the clutch pressing amount changing amount in accordance with the difference of the target clutch torque and the actual clutch torque. The clutch torque is zero in the disengaged state, and the clutch pressing amount changing amount thus increases and the clutch 3 enters the half-clutch state from the disengaged state.

Due to the reverse movement in the forward gear position, the direction of the torque that the engine 2 applies to the driving side portion 31 of the clutch 3 is opposite the direction of the torque transmitted from the vehicle wheel 5 to the driven side portion 32. Therefore when the driving side portion 31 and the driven side portion 32 are put in contact, the actual engine speed decreases. The engine 2 thus generates a positive torque (see FIG. 2) and accordingly, the actual clutch torque increases and takes on a positive value. The actual clutch torque thus approaches the target clutch torque. On the other hand, by the actual clutch torque approaching the target clutch torque, the clutch pressing amount changing amount decreases. Further, when the actual clutch torque becomes greater than the target clutch torque, the clutch pressing amount changing amount becomes a negative value and the clutch pressing amount decreases. The clutch pressing amount is thus increased and decreased so that the actual clutch torque approaches the target clutch torque and the half-clutch state that maintains this state is sustained.

By such an operation, the rotation of the driven side portion 32 is suppressed by the positive engine torque generated by the engine 2 and braking of the vehicle wheel 5 can be performed using the torque of the engine 2. On the other hand, the engine speed is maintained at a value corresponding to the target clutch torque (see FIG. 2) and therefore engine stall will not occur. Downward movement (reverse movement) on a downward slope by coasting while staying in forward gear can thus be performed while avoiding engine stall and applying engine braking.

The operation is the same in a case of moving downward (moving forward) by coasting on a downward slope in a state where the gear position of the transmission 4 is a reverse gear position. This is because when the vehicle 1 moves forward in reverse gear, the driven side portion 32 of the clutch 3 rotates in the opposite direction as the driving side portion 31 that is rotated by the engine 2.

As described above, with the present preferred embodiment, when one of either or both of Condition 1 that the driven side rotational speed is higher than the driving side rotational speed and Condition 2 that the vehicle speed (that is, the driven side rotational speed) is not less than the first predetermined value V1 is or are met due to coasting of the vehicle 1 when the clutch 3 is in the disengaged state, the half-clutch control is started. In the half-clutch control, the mutually pressing force of the driving side portion 31 and the driven side portion 32 is increased if the actual clutch torque is less than the target clutch torque. On the other hand, the pressing force is decreased if the actual clutch torque is greater than the target clutch torque. Control of the pressing force is achieved by control of the clutch actuator 11. Therefore by controlling the clutch actuator 11, the actual clutch torque is adjusted to the target clutch torque. The target clutch torque is set to a value equivalent to the engine torque generated by the engine 2 at an engine speed lower than the idling engine speed equivalent value.

As has already been described in detail, movement down a slope using gravity can thus be performed while applying engine braking and without occurrence of engine stall regardless of whether or not the gear position of the transmission 4 and the moving direction of the vehicle 1 are matched.

Also with the present preferred embodiment, in the half-clutch control, the target clutch torque corresponding to full accelerator closure is set to a value corresponding to the engine torque generated by the engine 2 at an engine speed higher than the lower limit engine speed at which the engine 2 can be kept running. Therefore, even if the gear position and the travel direction of the vehicle 1 are not matched, movement down a slope can be performed using gravity while avoiding engine stall and applying engine braking.

Also with the present preferred embodiment, the idling engine speed is set variably in accordance with a parameter, such as the intake air temperature, oil temperature, whether or not starting has just been performed, cooling water temperature (engine temperature), etc., and accordingly, the target clutch torque is set variably in accordance with the idling engine speed at the time of start of the half-clutch control. Movement down a slope using gravity can thereby be performed while applying engine braking and reliably avoiding engine stall regardless of the gear position being a forward gear position or a reverse gear position.

Also with the present preferred embodiment, the pressing amount changing amount is set variably in accordance with the difference of the actual clutch torque and the target clutch torque (more specifically, the deviation of the target clutch torque with respect to the actual clutch torque). An appropriate pressing force can thereby be attained, especially when moving down a slope in a state where the gear position and the travel direction of the vehicle 1 are not matched.

Also by the changing amount being set to be greater the greater the difference, an appropriate pressing force can be realized quickly. Movement down a slope using gravity can thus be performed in a state of generating an appropriate engine braking force while avoiding engine stall.

Further with the present preferred embodiment, the vehicle speed sensor 16 includes the rotational pulse generating unit 16a that generates, in accordance with the rotation of the drive shaft 42, rotational pulses that are not related to the rotational direction but are in accordance with the rotational amount. Therefore the vehicle speed information does not include information related to the travel direction of the vehicle 1, that is, the rotational direction of the vehicle wheel 5. Despite being such an arrangement that uses the inexpensive vehicle speed sensor 16 that does not output information related to direction, movement down a slope using gravity can be performed while applying engine braking and avoiding engine stall regardless of the gear position. This is because, as described above, the arrangement that controls the pressing force of the clutch 3 by comparing the actual clutch torque and the target clutch torque is capable of actuation independent of whether or not the gear position and the travel direction of the vehicle 1 are matched.

Also with the present preferred embodiment, the clutch 3 is disengaged when the vehicle speed, that is, the driven side rotational speed is not more than the clutch disengage threshold. That is, when the driven side rotational speed becomes not more than the predetermined value due to deceleration of the vehicle 1, the clutch 3 is disengaged. Excessive decrease of the engine speed can thereby be avoided and engine stall due to automatic disengagement of the clutch 3 can be avoided.

Also with the present preferred embodiment, the driven side rotational speed is equivalent to the vehicle speed of the vehicle 1. The half-clutch control can thus be performed in accordance with the vehicle speed. The vehicle speed may be used as the driven side rotational speed or another index corresponding to the vehicle speed may be used as the driven side rotational speed.

Figure 18:
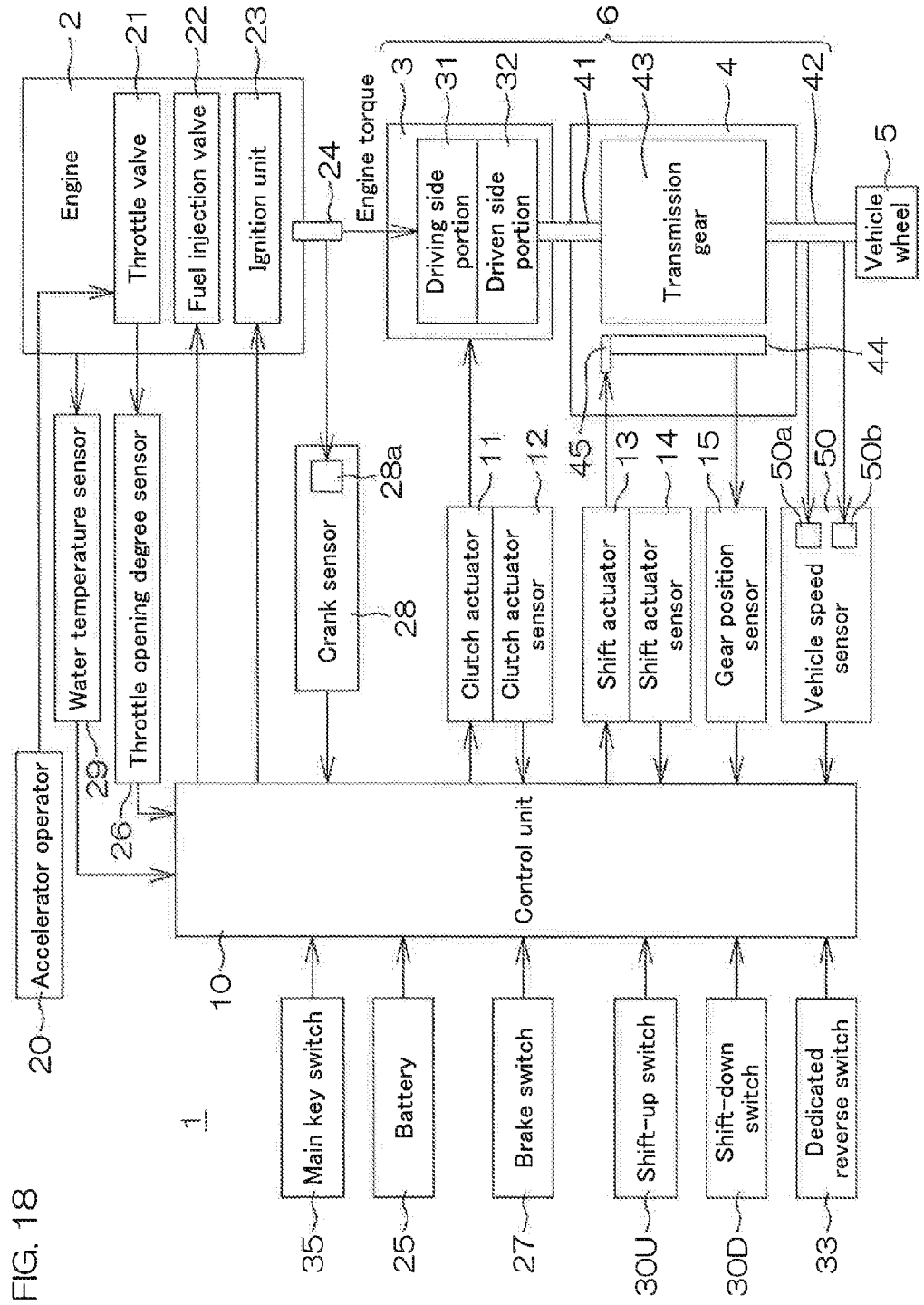
FIG. 18 is a block diagram of the arrangement of a vehicle to which a clutch control system according to a third preferred embodiment of the present invention is applied.

FIG. 18 is a block diagram of the arrangement of the vehicle 1 to which a clutch control system according to a third preferred embodiment of the present invention is applied. In FIG. 18, portions corresponding to the respective portions shown in FIG. 1 are provided with the same reference symbols.

In the present preferred embodiment, a vehicle speed sensor 50 integrally includes a rotational pulse generating unit 50a and a rotational direction sensor 50b.

The rotational pulse generating unit 50a generates in accordance with the rotation of the drive shaft 42, rotational pulses that are not related to the rotational direction but are in accordance with the rotational amount. The rotational pulses generated by the rotational pulse generating unit 50a are input into the control unit 10. As in the first preferred embodiment, the control unit 10, may, for example, count the rotational pulses input per unit time and calculate the vehicle speed based on the counting result. Also, the control unit 10 may measure a duration required for input of a plurality of rotational pulses of a predetermined number and calculate the vehicle speed based on the measured duration.

The rotational direction sensor 50b detects whether the rotational direction of the drive shaft 42 is the forward movement direction or the reverse movement direction. The forward movement direction is the rotational direction of the drive shaft 42 when the vehicle 1 moves forward. The reverse movement direction is the rotational direction of the drive shaft 42 when the vehicle 1 moves in reverse. The rotational direction sensor 50b may, for example, be another rotational pulse generating unit that generates rotational pulses that are shifted in phase by 90 degrees with respect to the rotational pulse generating unit 50a. In this case, the control unit 10 may be arranged to determine the rotational direction of the drive shaft 42 based on a phase shift of output signal waveforms of the two rotational pulse generating units 50a and 50b.

Operations of the control unit 10 when the vehicle 1 coasts are the same as that in the case of FIG. 3 that was referenced above in the description of the first preferred embodiment. Operations related to the half-clutch control transition determination (step S4 in FIG. 3) and the half-clutch control end determination (step S6 in FIG. 3) are also the same and are as shown in FIG. 4A and FIG. 4B, respectively. FIG. 3, FIG. 4A, and FIG. 4B shall thus be referenced together in the following description.

With the present preferred embodiment, the contents of the half-clutch control (step S5 in FIG. 3) differ from those of the first and second preferred embodiments. Specifically, the processes performed by the control unit 10 are as shown in FIG. 19.

Figure 19:
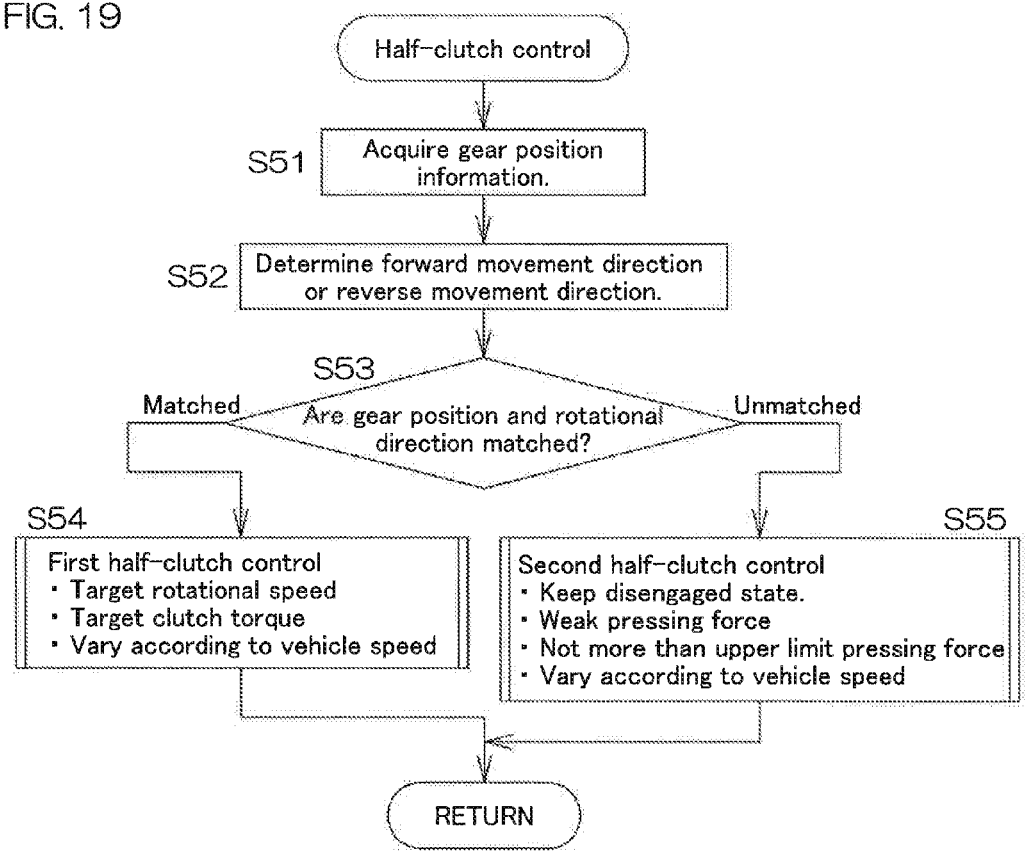
FIG. 19 is a flowchart for describing a specific example of half-clutch control.

FIG. 19 is a flowchart for describing a specific example of the half-clutch control. Upon transition into the half-clutch control, the control unit 10 acquires the gear position information from the gear position sensor 15 (step S51) and further determines whether the rotational direction of the drive shaft 42 is the forward movement direction or the reverse movement direction based on the output from the rotational direction sensor 50*b* (step S52). The gear position sensor 15 is an example of a gear position acquisition unit that acquires gear position information. Also, the rotational direction sensor 50*b* is an example of a forward/reverse movement determining unit.

Further, the control unit 10 judges whether or not the acquired gear position and the rotational direction of the drive shaft 42 detected by the rotational direction sensor 50*b* are matched (step S53).

If the acquired gear position information indicates a forward gear position and the rotational direction of the drive shaft 42 is the forward movement direction, the control unit 10 makes the "matched" judgment. Further, if the acquired gear position information indicates a reverse gear position and the rotational direction of the drive shaft 42 is the reverse movement direction, the control unit 10 makes the "matched" judgment. On the other hand, if the acquired gear position information indicates a forward gear position and the rotational direction of the drive shaft 42 is the reverse movement direction, the control unit 10 makes the "unmatched" judgment. Further, if the acquired gear position information indicates a reverse gear position and the rotational direction of the drive shaft 42 is the forward movement direction, the control unit 10 makes the "unmatched" judgment.

If the matched judgment is made, the control unit 10 executes a first half-clutch control (step S54). On the other hand, if the unmatched judgment is made, the control unit 10 executes a second half-clutch control that differs from the first half-clutch control (step S55). The processes of steps S53 to S55 correspond a function of the control unit 10 as the half-clutch control unit.

With the present arrangement, when the driven side rotational speed becomes higher than the driving side rotational speed (step S12 of FIG. 4A) and the driven side rotational speed becomes not less than the first predetermined value V1 (step S13 of FIG. 4A) due to coasting of the vehicle 1, the half-clutch control (FIG. 19) is started. The half-clutch control is the first half-clutch control (step S54 of FIG. 19) if the gear position of the transmission 4 and the rotational direction of the driven side portion 32 are matched and is the second half-clutch control (step S55 of FIG. 19) if these are not matched. Appropriate half-clutch control can thus be executed in accordance with the matching/non-matching of the gear position and the rotational direction of the driven side portion 32.

Also, the vehicle speed sensor 50 has the arrangement integrating the rotational pulse generating unit 50*a* and the rotational direction sensor 50*b*, and therefore the rotational direction of the vehicle wheel 5 can be detected and whether or not the vehicle 1 is moving forward or in reverse can be determined without an increase in units. Appropriate half-clutch control can thus be executed in accordance with the matching/non-matching of the gear position and the travel direction of the vehicle 1 without causing a significant cost increase.

The first half-clutch control may, for example, be the same control as the half-clutch control (see FIG. 5) of the first preferred embodiment. That is, the control unit 10 sets the accelerator full closure target engine speed (steps S31 and S32) and determines the clutch pressing force changing amount based on the deviation (difference) of the actual engine speed with respect to the target engine speed (step S33). Further, the control unit 10 renews the clutch command value by adding the clutch pressing amount changing amount to the previous clutch command value (step S34). That is, the first half-clutch control may be a control of varying the pressing amount of the driving side portion 31 and the driven side portion 32 in accordance with the driven side rotational speed.

Also, the first half-clutch control may be the same control as the half-clutch control (see FIG. 13) of the second preferred embodiment. That is, the control unit 10 sets the accelerator full closure target clutch torque (steps S41 and S42) and determines the clutch pressing amount changing amount based on the deviation (difference) of the target clutch torque with respect to the actual clutch torque (steps S43 and S44). Further, the control unit 10 renews the clutch command value by adding the clutch pressing amount changing amount to the previous clutch command value (step S45). That is, the first clutch control may be a control of varying the pressing force of the driving side portion 31 and the driven side portion 32 in accordance with the clutch torque.

In either case, the first half-clutch control is a control of monotonously increasing the pressing force between the driving side portion 31 and the driven side portion 32 to induce transition of the clutch 3 from the half-clutch state to the engaged state and maintain the engaged state. Engine braking can thereby be applied.

The second half-clutch control may be a control of increasing and decreasing the pressing force of the driving side portion 31 and the driven side portion 32 to keep the engine speed or the clutch torque fixed and thereby maintain the half-clutch state. The rotation of the vehicle wheel 5 can thereby be suppressed by the rotation of the engine 2 while avoiding engine stall. Engine braking can thus be used while avoiding engine stall without dependence on the matching/non-matching of the gear position and the rotational direction of the driven side portion 32.

The second half-clutch control may be a control of driving the clutch actuator 11 to keep the clutch 3 in the disengaged state. In this case, when the gear position and the rotational direction of the driven side portion 32 are unmatched, the clutch is kept in the disengaged state so that occurrence of engine stall due to torque input from the driven side portion 32 can be avoided. Movement down a slope using gravity can thus be performed while avoiding engine stall even in a state where the gear position and the rotational direction of the driven side portion 32 are unmatched.

Also, the second half-clutch control may be a control of driving the clutch actuator 11 so that the driving side portion 31 and the driven side portion 32 are pressed against each other by a weak pressing force therebetween in comparison to the first half-clutch control. With the present arrangement, the pressing force of the driving side portion 31 and the driven side portion 32 are weakened when the gear position and the rotational direction of the driven side portion 32 are unmatched, and therefore input of the torque, input from the driven side portion 32, into the engine 2 is restricted. Engine stall can thereby be avoided. Movement down a slope using gravity can thus be performed while avoiding engine stall.

Figure 20:
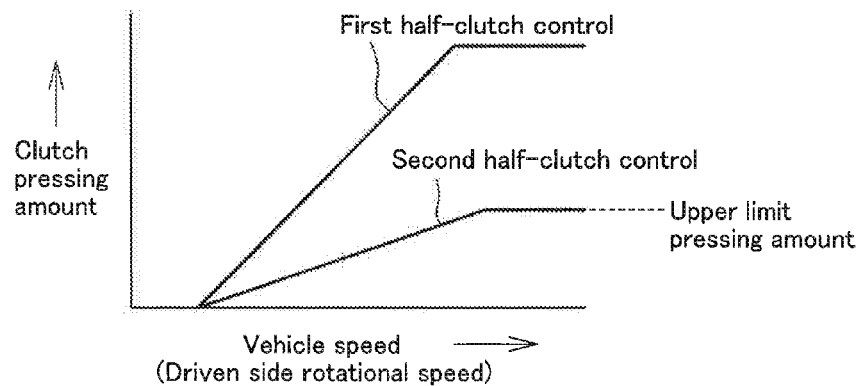
FIG. 20 is a characteristics diagram of specific examples of a first half-clutch control and a second half-clutch control.

Also, as shown in FIG. 20, the first half-clutch control may be a control of increasing and decreasing the clutch pressing force in accordance with the vehicle speed, that is, the driven side rotational speed. Specifically, the clutch pressing amount is preferably determined in accordance with characteristics such that the clutch pressing amount increases as the driven side rotational speed increases. An upper limit value of the clutch pressing amount in the first half-clutch control may be a value equivalent to the disengaged state.

In this case, the second half-clutch control may similarly be a control of increasing and decreasing the clutch pressing amount in accordance with the vehicle speed, that is, the driven side rotational speed as shown together in FIG. 20. Specifically, the clutch pressing amount is preferably determined in accordance with characteristics such that the clutch pressing amount increases as the driven side rotational speed increases. However, the clutch pressing amount of the second half-clutch control is preferably of a value less than the clutch pressing amount generated by the first half-clutch control for the same driven side rotational speed. Also, the upper limit value of the clutch pressing amount in the second half-clutch control is preferably not more than an upper limit pressing amount that is less than a clutch pressing amount by which the clutch 3 is put in the engaged state.

By such an arrangement, appropriate half-clutch control can be performed in accordance with the driven side rotational speed. When the gear position and the rotational direction of the vehicle wheel 5 are unmatched, the pressing force of the driving side portion 31 and the driven side portion 32 is made smaller than when these are matched. Half-clutch control can thereby be performed while avoiding engine stall and therefore movement down a slope can be performed using gravity. Also, in the second half-clutch control that is performed when the gear position and the rotational direction of the vehicle wheel 5 are unmatched, the clutch actuator 11 is controlled so that the clutch 3 is not put in the engaged state. Torque transmission between the engine 2 and the vehicle wheel 5 can thereby be performed while avoiding engine stall. Movement down a slope using gravity can thus be performed while applying engine braking.

Although preferred embodiments of the present invention have been described, the present invention may be implemented in yet other modes as listed for example below.

(1) With each of the preferred embodiments described above, an arrangement where a single control unit 10 controls the engine 2, the clutch 3, and the transmission 4 was illustrated. This does not necessarily mean that the control unit 10 includes just a single computer. That is, the control unit 10 may include a plurality of computers. For example, the control unit 10 may include an engine control unit that controls the engine 2 and a shift control unit that controls the clutch 3 and the transmission 4.

(2) With each of the preferred embodiments described above, an arrangement where automatic downshifting is performed in accordance with decrease of vehicle speed was illustrated. However, the present invention may also be applied to a vehicle with an arrangement that includes a function of automatically disengaging the clutch in accordance with decrease of vehicle speed but does not include an automatic shift-down function.

The present application corresponds to Japanese Patent Application No. 2014-254386 filed in the Japan Patent Office on Dec. 16, 2014, and the entire disclosure of the application is incorporated herein by reference.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A clutch control system for a vehicle having an engine, a vehicle wheel, a clutch disposed in a power transmission path from the engine to the vehicle wheel and a transmission disposed in the power transmission path,
the clutch having a driving side portion and a driven side portion disposed respectively at an engine side on the power transmission path and a vehicle wheel side on the power transmission path,
the vehicle including a clutch actuator that controls engagement and disengagement of the driving side portion and the driven side portion to each other,
the transmission being arranged to enable selection among a plurality of gear positions including
a forward gear position at which a driving force of the engine is converted to a rotational force in a forward movement direction of the vehicle wheel, and
a reverse gear position at which the driving force of the engine is converted to a rotational force in a reverse movement direction of the vehicle wheel,
the clutch control system for the vehicle comprising:
a first rotational speed detecting unit that detects a driving side rotational speed corresponding to a rotational speed of the driving side portion of the clutch;
a second rotational speed detecting unit that detects a driven side rotational speed corresponding to a rotational speed of the driven side portion of the clutch;
a target rotational speed setting unit that sets, as a target rotational speed corresponding to full accelerator closure, a value lower than a value equivalent to an idling engine speed of the engine;
a half-clutch control unit programmed to perform half-clutch control of the clutch actuator so as to
increase a mutual pressing force of the driving side portion and the driven side portion to each other if the driving side rotational speed is higher than the target rotational speed, and
decrease the mutual pressing force if the driving side rotational speed is lower than the target rotational speed; and
a half-clutch transition control unit programmed to perform a transition to the half-clutch control of the clutch actuator by the half-clutch control unit when both
the clutch is in a disengaged state so that the driving and driven side portions are disengaged from each other, and
at least one condition among the following is met:
a first condition that the driven side rotational speed is higher than the driving side rotational speed, and
a second condition that the driven side rotational speed is not less than a predetermined value.

2. The clutch control system for the vehicle according to claim 1, wherein the target rotational speed setting unit sets the value of the target rotational speed corresponding to full accelerator closure to be higher than a value equivalent to a lower limit engine speed at which the engine can be kept running.

3. The clutch control system for the vehicle according to claim 1, wherein the target rotational speed setting unit sets the target rotational speed variably in accordance with the idling engine speed when the half-clutch transition control unit performs the transition to the half-clutch control.

4. The clutch control system for the vehicle according to claim 1, wherein the half-clutch control unit is programmed to variably set a changing amount of the pressing force in accordance with a difference between the driving side rotational speed and the target rotational speed.

5. The clutch control system for the vehicle according to claim 4, wherein the half-clutch control unit is programmed to set the changing amount to increase as the difference increases.

6. A clutch control system for a vehicle having an engine, a vehicle wheel, a clutch disposed in a power transmission path from the engine to the vehicle wheel and a transmission disposed in the power transmission path,
the clutch having a driving side portion and a driven side portion disposed respectively at an engine side on the power transmission path and a vehicle wheel side on the power transmission path,
the vehicle including a clutch actuator that controls engagement and disengagement of the driving side portion and the driven side portion to each other,
the transmission being arranged to enable selection among a plurality of gear positions including
a forward gear position at which a driving force of the engine is converted to a rotational force in a forward movement direction of the vehicle wheel, and
a reverse gear position at which the driving force of the engine is converted to a rotational force in a reverse movement direction of the vehicle wheel,
the clutch control system for the vehicle comprising:
a first rotational speed detecting unit that detects a driving side rotational speed corresponding to a rotational speed of the driving side portion of the clutch;
a second rotational speed detecting unit that detects a driven side rotational speed corresponding to a rotational speed of the driven side portion of the clutch;
a target clutch torque setting unit that sets, as a target clutch torque corresponding to full accelerator closure, a value
greater than a value equivalent to an engine torque generated by the engine at an idling engine speed, and
less than a value equivalent to an engine torque generated by the engine at a predetermined engine speed lower than the idling engine speed;
a clutch torque acquisition unit that acquires an actual clutch torque transmitted from the driving side portion to the driven side portion;
a half-clutch control unit programmed to perform half-clutch control of the clutch actuator so as to
increase a mutual pressing force of the driving side portion and the driven side portion to each other if the actual clutch torque is lower than the target clutch torque, and
decrease the pressing force if the actual clutch torque is higher than the target clutch torque; and
a half-clutch transition control unit programmed to perform a transition to the half-clutch control of the clutch actuator by the half-clutch control unit when both
the clutch is in a disengaged state so that the driving and driven side portions are disengaged from each other, and
at least one condition among the following is met:
a first condition that the driven side rotational speed is higher than the driving side rotational speed, and
a second condition that the driven side rotational speed is not less than a predetermined value.

7. The clutch control system for the vehicle according to claim 6, wherein the target clutch torque setting unit sets the value of the target clutch torque corresponding to full accelerator closure, to be equivalent to an engine torque generated by the engine at a lower limit engine speed at which the engine can be kept running.

8. The clutch control system for the vehicle according to claim 6, wherein the target clutch torque setting unit sets the target clutch torque variably in accordance with the idling engine speed when the half-clutch transition control unit performs the transition to the half-clutch control.

9. The clutch control system for the vehicle according to claim 6, wherein the half-clutch control unit is programmed to variably set a changing amount of the pressing force in accordance with a difference between the actual clutch torque and the target clutch torque.

10. The clutch control system for the vehicle according to claim 9, wherein the half-clutch control unit is programmed to set the changing amount to increase as the difference increases.

11. The clutch control system for the vehicle according to claim 1, wherein
the vehicle includes one rotational shaft between the driven side portion of the clutch and the vehicle wheel, and
the second rotational speed detecting unit includes a rotational pulse generating unit that generates, in accordance with rotation of the one rotational shaft, rotational pulses that are not related to rotational direction but are in accordance with rotational amount.

12. The clutch control system for the vehicle according to claim 6, wherein
the vehicle includes one rotational shaft between the driven side portion of the clutch and the vehicle wheel, and
the second rotational speed detecting unit includes a rotational pulse generating unit that generates, in accordance with rotation of the one rotational shaft, rotational pulses that are not related to rotational direction but are in accordance with rotational amount.

13. A clutch control system for a vehicle having an engine, a vehicle wheel, a clutch in a power transmission path from the engine to the vehicle wheel and a transmission disposed in the power transmission path,
the clutch having a driving side portion and a driven side portion disposed respectively at an engine side on the power transmission path and a vehicle wheel side on the power transmission path,
the vehicle including a clutch actuator that controls engagement and disengagement of the driving side portion and the driven side portion to each other,
the transmission being arranged to enable selection among a plurality of gear positions including
a forward gear position at which a driving force of the engine is converted to a rotational force in a forward movement direction of the vehicle wheel, and
a reverse gear position at which the driving force of the engine is converted to a rotational force in a reverse movement direction of the vehicle wheel,
the clutch control system for the vehicle comprising:
a first rotational speed detecting unit that detects a driving side rotational speed corresponding to a rotational speed of the driving side portion of the clutch;
a second rotational speed detecting unit that detects a driven side rotational speed corresponding to a rotational speed of the driven side portion of the clutch;
a half-clutch control unit programmed to perform half-clutch control of the clutch actuator to execute
a first half-clutch control on the clutch actuator when a current gear position of the transmission and a rotational direction of the driven side portion of the clutch are in a matched state, and
a second half-clutch control, differing from the first half-clutch control, on the clutch actuator, when the current gear position and the rotational direction of the driven side portion of the clutch are not in the matched state; and a half-clutch transition control unit programmed to perform a transition to the half-clutch control of the clutch actuator by the half-clutch control unit when both
the clutch is in a disengaged state so that the driving and driven side portions are disengaged from each other, and
at least one of the following conditions is met:
a first condition that the driven side rotational speed is higher than the driving side rotational speed, and
a second condition that the driven side rotational speed is not less than a predetermined value.

14. The clutch control system for the vehicle according to claim 13, further comprising:
a gear position acquisition unit that acquires gear position information of the transmission to detect the current gear position; and
a forward/reverse movement determining unit that determines vehicle wheel information indicating whether the vehicle wheel is rotating in the forward movement direction or is rotating in the reverse movement direction;
wherein the half-clutch control unit is programmed to execute the first half-clutch control if
the acquired gear position information indicates the forward gear position, and the vehicle wheel information indicates that the vehicle wheel is rotating in the forward movement direction so that the matched state exists, or
the acquired gear position information indicates the reverse gear position, and the vehicle wheel information indicates that the vehicle wheel is rotating in the reverse movement direction so that the matched state exists,
wherein the half-clutch control unit is programmed to execute the second half-clutch control if
the acquired gear position information indicates the forward gear position, and the vehicle wheel information indicates that the vehicle wheel is rotating in the reverse movement direction so that the matched state does not exist, or
the acquired gear position information indicates the reverse gear position, and the vehicle wheel information indicates that the vehicle wheel is rotating in the forward movement direction so that the matched state does not exist.

15. The clutch control system for the vehicle according to claim 14, wherein the forward/reverse movement determining unit includes a rotational direction sensor made integral to the second rotational speed detecting unit.

16. The clutch control system for the vehicle according to claim 13, wherein the second half-clutch control includes controlling driving of the clutch actuator to keep the clutch in the disengaged state.

17. The clutch control system for the vehicle according to claim 13, wherein the second half-clutch control includes controlling driving of the clutch actuator so that the driving side portion and the driven side portion are pressed against each other by a weak pressing force therebetween in comparison to a pressing force between the driving and driven side portions executed in the first half-clutch control.

18. The clutch control system for the vehicle according to claim 13, wherein the first half-clutch control includes controlling driving of the clutch actuator to vary a first pressing force between the driving and driven side portions in accordance with the driven side rotational speed, and
the second half-clutch control includes controlling driving of the clutch actuator to vary a second pressing force between the driving and driven side portions in accordance with the driven side rotational speed,
wherein at a same value for the driven side rotational speed in the first and second half-clutch controls, the second pressing force is less than the first pressing force.

19. The clutch control system for the vehicle according to claim 13, wherein the second half-clutch control includes controlling driving of the clutch actuator to generate a pressing force, that is between the driving and driven side portions, to be not more than an upper limit pressing force that is less than a pressing force by which the clutch is put in an engaged state.

20. The clutch control system for vehicle according to claim 1, further comprising a disengagement control unit that controls the clutch actuator to disengage the clutch when the driven side rotational speed is not more than another predetermined value.

21. The clutch control system for vehicle according to claim 6, further comprising: a disengagement control unit that controls the clutch actuator to disengage the clutch when the driven side rotational speed is not more than another predetermined value.

22. The clutch control system for vehicle according to claim 13, further comprising: a disengagement control unit that controls the clutch actuator to disengage the clutch when the driven side rotational speed is not more than another predetermined value.

23. The clutch control system for vehicle according to claim 1, wherein the driven side rotational speed is equivalent to the vehicle speed of the vehicle.

24. The clutch control system for vehicle according to claim 6, wherein the driven side rotational speed is equivalent to the vehicle speed of the vehicle.

25. The clutch control system for vehicle according to claim 13, wherein the driven side rotational speed is equivalent to the vehicle speed of the vehicle.

* * * * *